United States Patent [19]
Brent

[11] Patent Number: 4,776,766
[45] Date of Patent: Oct. 11, 1988

[54] PORTABLE AIR PUMP ASSEMBLY AND DETECHABLE SAFETY LAMP FOR AUTOMOTIVE VEHICLE

[75] Inventor: Allan Brent, New York, N.Y.

[73] Assignee: Interdynamics, Inc., Brooklyn, N.Y.

[21] Appl. No.: 85,399

[22] Filed: Aug. 14, 1987

[51] Int. Cl.[4] .................... F04B 49/06; F04B 39/00; F21L 11/00

[52] U.S. Cl. ...................... 417/44; 417/33; 417/63; 417/313; 417/411; 362/190; 362/191; 362/253; 137/224; 137/227; 340/87; 152/415; 200/82 R

[58] Field of Search ............ 417/44, 33, 63, 234, 417/313, 411, 415; 362/190, 191, 253, 154; 340/87, 321; 200/82 R; 137/224, 227; 152/415

[56] References Cited

U.S. PATENT DOCUMENTS

| | | | |
|---|---|---|---|
| 1,647,818 | 11/1927 | Semak | 417/411 X |
| 1,838,811 | 12/1931 | Doran | 137/227 X |
| 2,010,062 | 8/1935 | Dawson | 417/44 |
| 2,589,747 | 3/1952 | Tedeschi | 340/321 |
| 2,623,934 | 12/1952 | De Bow et al. | 340/321 |
| 2,980,889 | 4/1961 | Meissner | 340/321 X |
| 3,063,046 | 11/1962 | Hurst | 340/321 X |
| 3,243,100 | 3/1966 | Adams | 417/411 X |
| 4,080,105 | 3/1978 | Connell | 417/33 X |
| 4,389,166 | 6/1983 | Harvey et al. | 417/234 |
| 4,535,391 | 8/1985 | Hsiao | 362/190 X |
| 4,614,479 | 9/1986 | Liu | 417/234 X |
| 4,621,984 | 11/1986 | Fussell | 417/411 X |
| 4,713,735 | 12/1987 | Hiltman | 362/191 X |
| 4,715,787 | 12/1987 | Hung | 417/234 X |

FOREIGN PATENT DOCUMENTS

2157775 10/1985 United Kingdom ............... 417/415

Primary Examiner—Paul F. Neils
Attorney, Agent, or Firm—Henry R. Lerner

[57] ABSTRACT

A portable air pump assembly and detachable safety lamp, includes an air compressor; an air supply line supplying pressurized air from the air compressor to a tire; an electrical supply line supplying current to the air compressor; electrical contacts which connect the electrical supply line to the air compressor only when they are in a closed condition; a by-pass air supply line having one end with the air compressor; a pressure limit switch connected with the opposite end of the by-pass air supply line for automatically causing termination of the current supply to the air compressor in response to back pressure from the tire when the tire has been inflated to a desired air pressure; and a safety lamp detachably connected with the housing for providing a warning light and operable in a connected or detached position.

37 Claims, 12 Drawing Sheets

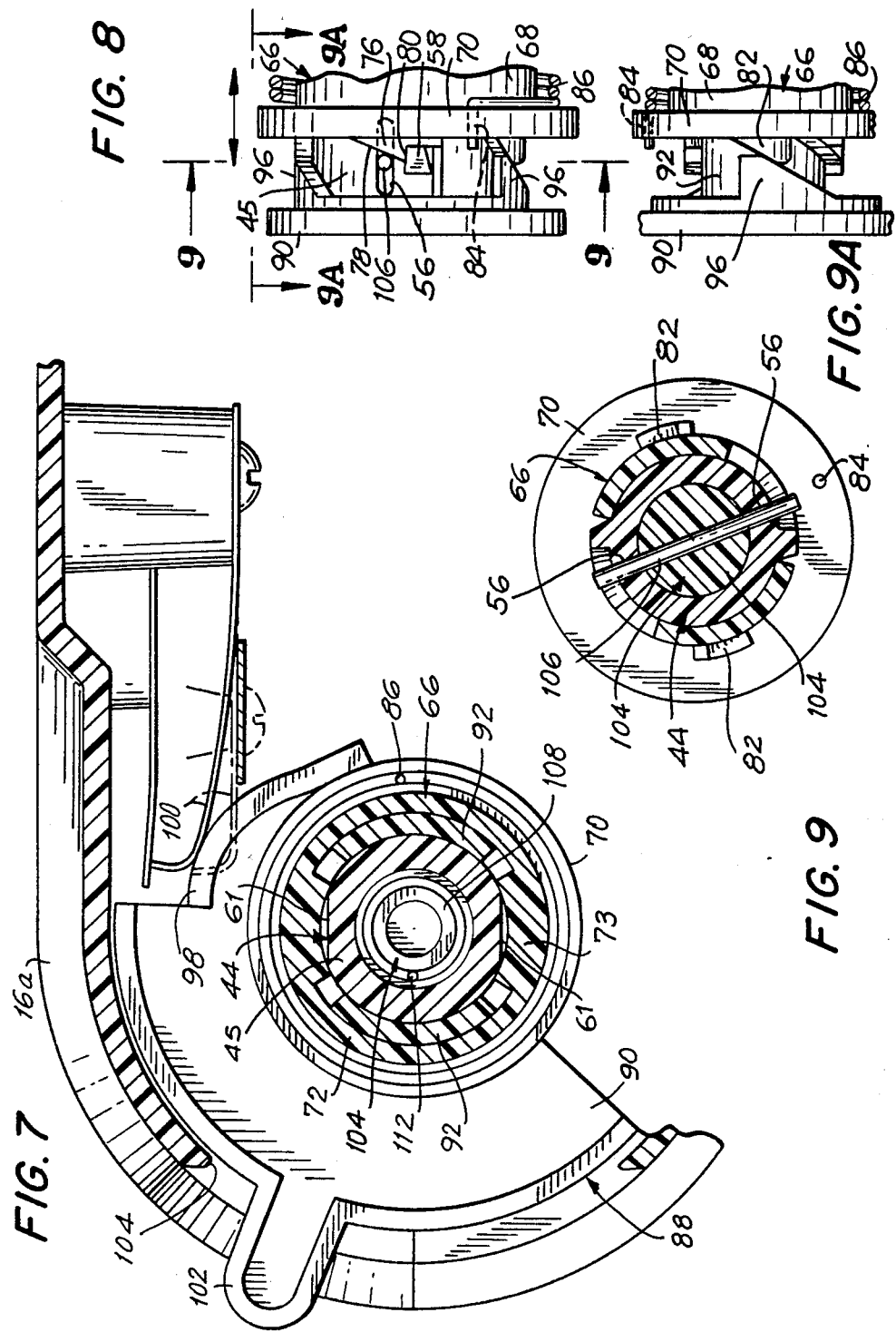

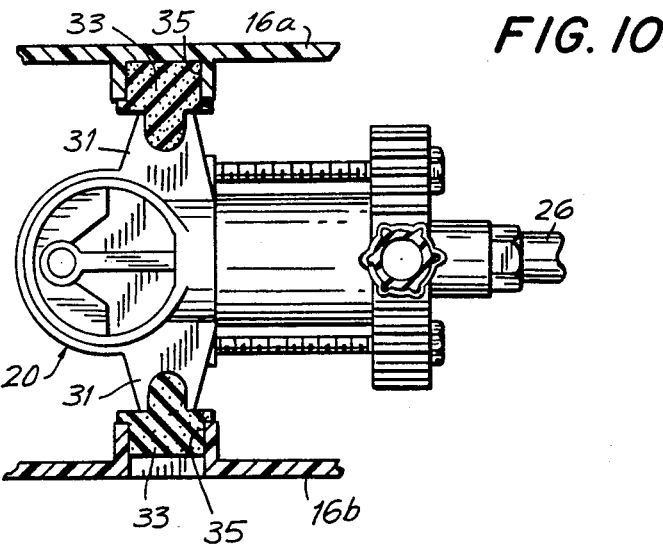
FIG. 10
FIG. 11
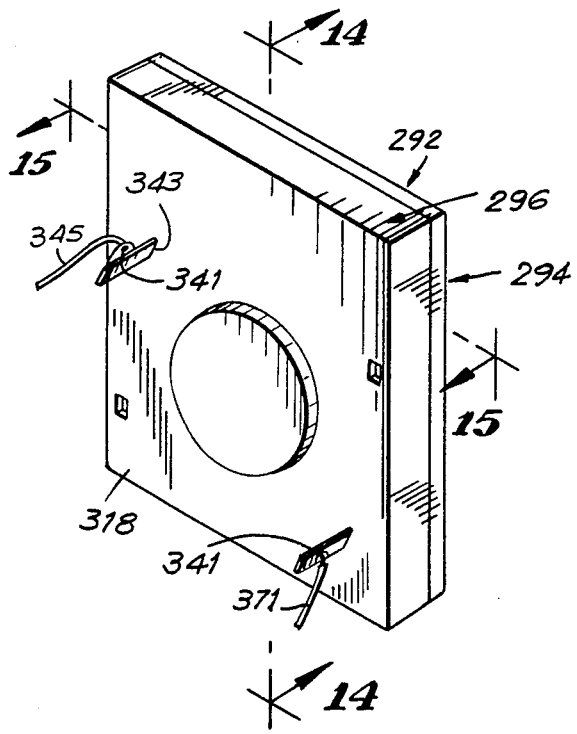
FIG. 13
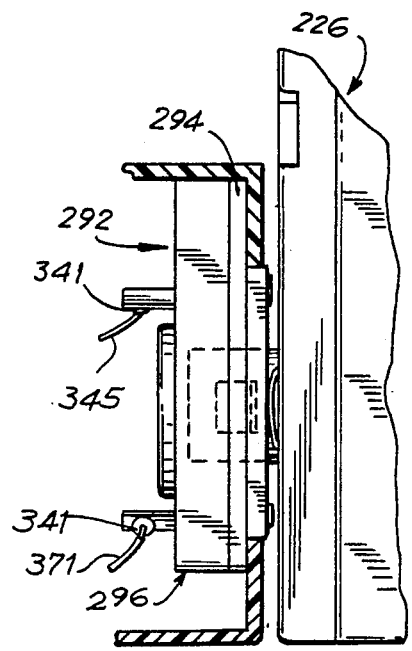

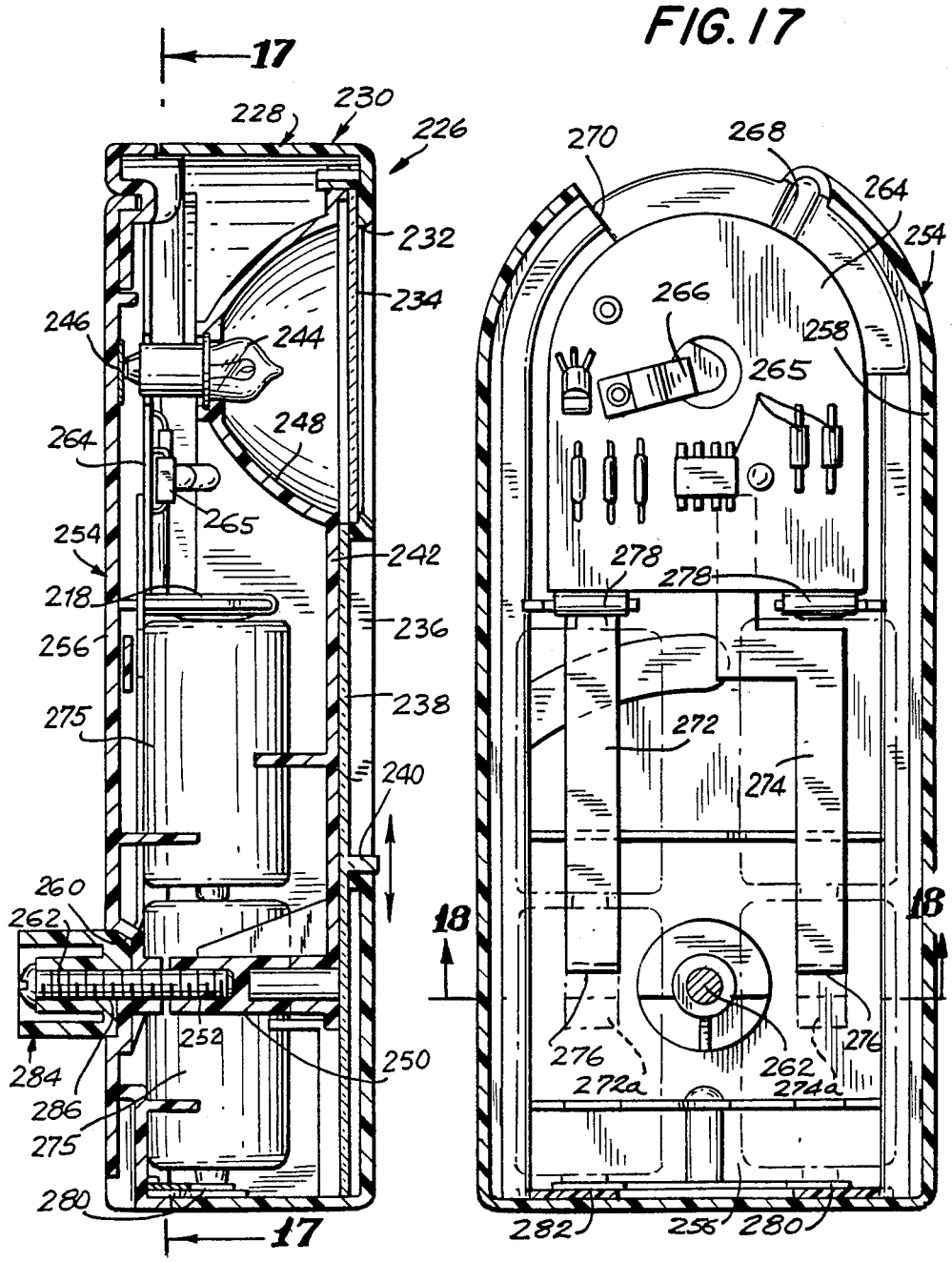

PORTABLE AIR PUMP ASSEMBLY AND DETECHABLE SAFETY LAMP FOR AUTOMOTIVE VEHICLE

BACKGROUND OF THE INVENTION

This invention relates generally to air pumps, and more particularly, is directed to a portable air pump assembly for inflating the tires of an automotive vehicle.

It is often necessary or desirable to inflate one or more tires of an automotive vehicle, but in many instances, there are no air pumps or compressors available. For example, when changing a flat tire on an automobile stranded on a deserted road, it is sometimes discovered too late that much of the air in the spare tire has escaped. As another example, it may be necessary to inflate a tire late at night when many service stations are closed.

For these and other reasons, portable air pumps have been developed which can easily be carried in the automotive vehicle. Such air pumps generally operate from the battery of the vehicle, either directly or through the cigarette lighter. An example of such a portable air pump is found in U.S. Pat. No. 4,614,479. In this patent, a pressure gauge includes a pressure setting pointer used to set a desired pressure. A pressure indicating pointer contacts the pressure setting pointer when the preset pressure has been reached, and thereby shuts off the motor through electric logic circuitry. However, because of the moving pressure indicating pointer and electric logic circuitry, this device is not so reliable in operation.

U.S. Pat. No. 4,080,105 discloses a tire inflator that uses a knob to adjust the spring pressure on a piston. When the tire has been inflated to the desired pressure, the piston is moved against the force of the spring, and at the same time, contacts and moves a linkage member that pivots and therefore disengages a latch from a switch actuating lever, thus allowing a spring loaded switch to return to its open position, thereby shutting off an air pump motor. This device, however, through the various linkages and levers, is relatively complex from a mechanical standpoint, with many moving parts, and may not be so reliable in operation. Further, this tire inflator is formed in a gun configuration with a trigger actuator, and is only used to inflate bicycle tires. Furthermore, it utilizes an electric plug which must be plugged into an electric outlet.

Other devices of similar or less relevant importance are disclosed in U.S. Pat. Nos. 1,647,818; 2,062,220; 2,217,288; 2,684,685; 3,844,319; 3,885,892; 4,187,058; 4,197,895; 4,212,334; 4,389,166; 4,424,006; 4,583,566; and 4,621,984.

OBJECTS AND SUMMARY OF THE INVENTION

Accordingly, it is an object of the present invention to provide a combination portable air pump and detachable safety lamp that overcomes the aforementioned problems.

It is another object of the present invention to provide a combination portable air pump and detachable safety lamp which provides a reliable manner of shutting off the air pump when the tire has been inflated to a preset pressure.

It is still another object of the present invention to provide a combination portable air pump and detachable safety lamp which provides a simplified mechanical arrangement with few mechanically moving parts to shut off the air pump when the tire has been inflated to a preset pressure.

It is yet another object of the present invention to provide a combination portable air pump and detachable safety lamp which provides for operation of the safety lamp from the battery of the vehicle when connected with the air pump assembly or from separate batteries in the safety lamp when detached from the air pump assembly.

It is a further object of the present invention to provide a combination portable air pump and detachable safety lamp which provides for operation of the safety lamp in a horizontal or vertical position when attached to the air pump assembly, or in a vertical position when detached from the air pump assembly.

It is a still further object of the present invention to provide a combination portable air pump and detachable safety lamp which provides a visual monitor of an LED inside the vehicle to indicate when the air pump has been automatically shut off.

It is a yet further object of the present invention to provide a combination portable air pump and detachable safety lamp that is easy and economical to manufacture and use.

In accordance with an aspect of the present invention, a portable air pump assembly includes:
(a) air compressor means for producing pressurized air and having an outlet to which the pressurized air is supplied;
(b) air supply line means for supplying the pressurized air from the outlet to a member to be inflated;
(c) electrical supply line means for supplying current to the air compressor means;
(d) electrical contact means for permitting current flow from the electrical supply line means to the air compressor means only when the electrical contact means is in a closed condition;
(e) a by-pass supply line having one end connected with the outlet of the air compressor means and a second, opposite end; and
(f) pressure limit switch means connected with the second, opposite end of the by-pass supply line for automatically causing termination of the supply of current from the electrical supply line means to the air compressor means in response to back pressure from the member to be inflated, when the member to be inflated has been inflated to a desired air pressure, the pressure limit switch means including:
  (i) a hollow front valve body including an opening fluidly connected with the second, opposite end of the by-pass supply line;
  (ii) a piston slidable in the front valve body;
  (iii) variable biasing means for applying a biasing force on the piston corresponding to the desired air pressure so as to normally bias the piston into blocking relation with respect to the opening in the front valve body;
  (iv) adjustment means for adjusting the biasing force by the variable biasing means;
  (v) a switch trigger rotatably and axially movable on the front valve body;
  (vi) spring means for applying a rotational and axial biasing force to the switch trigger on the front valve body;
  (vii) hold means for holding the switch trigger in a releasable rotational position on the front valve body, against the rotational biasing force of the spring means;

(viii) switch knob means for rotating the switch trigger against the rotational biasing force of the spring means so that the hold means holds the switch trigger in the releasable rotational position, the switch knob means including cam means for closing the electrical contact means when the switch trigger is held in the releasable rotational position so that current is supplied from the electrical supply line means to the air compressor means; and (ix) abutment means connected with the piston for moving the switch trigger axially along the front valve body against the axial biasing force of the spring means to release the switch trigger from the releasable rotational position when the member to be inflated has been inflated to the desired air pressure;

whereby the spring means rotates the switch trigger and the switch knob means when the abutment means moves the switch trigger axially against the axial biasing force of the spring means so that the cam means opens the electrical contact means such that current is no longer supplied from the electrical supply line means to the air compressor means.

In accordance with another aspect of the present invention, a portable air pump assembly and detachable safety lamp, includes:

(a) a housing;
(b) air compressor means in the housing for producing pressurized air and having an outlet to which the pressurized air is supplied;
(c) air supply line means extending from the housing for supplying the pressurized air from the outlet to a member to be inflated;
(d) electrical supply line means extending from the housing for supplying current to the air compressor means;
(e) electrical contact means in the housing for permitting current flow from the electrical supply line means to the air compressor means only when the electrical contact means is in a closed condition;
(f) a by-pass supply line in the housing and having one end connected with the outlet of the air compressor means and a second, opposite end;
(g) pressure limit switch means in the housing and connected with the second, opposite end of the by-pass supply line for automatically causing termination of the supply of current from the electrical supply line means to the air compressor means in response to back pressure from the member to be inflated, when the member to be inflated has been inflated to a desired air pressure; and
(h) safety lamp means detachably connected with the housing for providing a warning light, the safety lamp means including first electrical connection means for supplying current to the safety lamp means from the electrical supply line means when the safety lamp means is connected with the housing and second electrical connection means for supplying current to the safety lamp means from a power source contained within the safety lamp means when the latter is detached from the housing.

In accordance with still another aspect of the present invention, a portable air pump assembly and detachable safety lamp, includes:

(a) a housing;
(b) air compressor means in the housing for producing pressurized air and having an outlet to which the pressurized air is supplied;
(c) air supply line means extending from the housing for supplying the pressurized air from the outlet to a member to be inflated;
(d) electrical supply line means extending from the housing for supplying current to the air compressor means;
(e) electrical contact means in the housing for permitting current flow from the electrical supply line means to the air compressor means only when the electrical contact means is in a closed condition;
(f) a by-pass supply line in the housing and having one end connected with the outlet of the air compressor means and a second, opposite end;
(g) pressure limit switch means in the housing and connected with the second, opposite end of the by-pass supply line for automatically causing termination of the supply of current from the electrical supply line means to the air compressor means in response to back pressure from the member to be inflated, when the member to be inflated has been inflated to a desired air pressure, the pressure limit switch means including:

(i) a hollow front valve body including an opening fluidly connected with the second, opposite end of the by-pass supply line;
(ii) a piston slidable in the front valve body;
(iii) variable biasing means for applying a biasing force on the piston corresponding to the desired air pressure so as to normally bias the piston into blocking relation with respect to the opening in the front valve body;
(iv) adjustment means for adjusting the biasing force by the variable biasing means;
(v) a switch trigger rotatably and axially movable on the front valve body;
(vi) spring means for applying a rotational and axial biasing force to the switch trigger on the front valve body;
(vii) hold means for holding the switch trigger in a releasable rotational position on the front valve body, against the rotational biasing force of the spring means;
(viii) switch knob means for rotating the switch trigger against the rotational biasing force of the spring means so that the hold means holds the switch trigger in the releasable rotational position, the switch knob means including cam means for closing the electrical contact means when the switch trigger is held in the releasable rotational position so that current is supplied from the electrical supply line means to the air compressor means; and
(ix) abutment means connected with the piston for moving the switch trigger axially along the front valve body against the axial biasing force of the spring means to release the switch trigger from the releasable rotational position when the member to be inflated has been inflated to the desired air pressure;

whereby the spring means rotates the switch trigger and the switch knob means when the abutment means moves the switch trigger axially against the axial biasing force of the spring means so that the cam means opens the electrical contact means such that current is no longer supplied from the electrical supply line means to the air compressor means; and (h) safety lamp means detachably connected with the housing for providing a warning light, the safety lamp means including first electrical connection means for supplying current to the safety lamp means from the electrical supply line means when the safety lamp means is connected with the housing and second electrical connection means for supplying current to the safety lamp means from a power source contained within the safety lamp means when the latter is detached from the housing.

The above and other objects, features and advantages of the present invention will become readily apparent from the following detailed description which is to be read in connection with the accompanying drawings.

BRIEF DESCRIPTION OF THE DRAWINGS

FIG. 7 is a cross-sectional view of the air pump assembly of FIG. 4, taken along line 7—7 thereof;

FIG. 8 is a plan view of the air pump assembly of FIG. 4, viewed from line 8—8 thereof, and showing a portion of the pressure limit switch thereof;

FIG. 9 is a cross-sectional view of the portion of the pressure limit switch of FIG. 8, taken along line 9—9 thereof;

FIG. 9A is a plan view of the portion of the pressure limit switch of FIG. 8, taken along line 9A—9A thereof;

FIG. 10 is a cross-sectional view of the air pump assembly of FIG. 3, taken along line 10—10 thereof;

FIG. 11 is a perspective view of the connector of the air pump assembly which is used for connecting the safety lamp to the air compressor;

FIG. 13 is a cross-sectional view of the safety lamp and a portion of the air pump assembly housing of FIG. 12, taken along line 13—13 thereof;

FIG. 16 is a cross-sectional view of the safety lamp of FIG. 2, taken along line 16—16 thereof;

FIG. 17 is a cross-sectional view of the safety lamp of FIG. 16, taken along line 17—17 thereof;

DETAILED DESCRIPTION OF A PREFERRED EMBODIMENT

Figure 1:
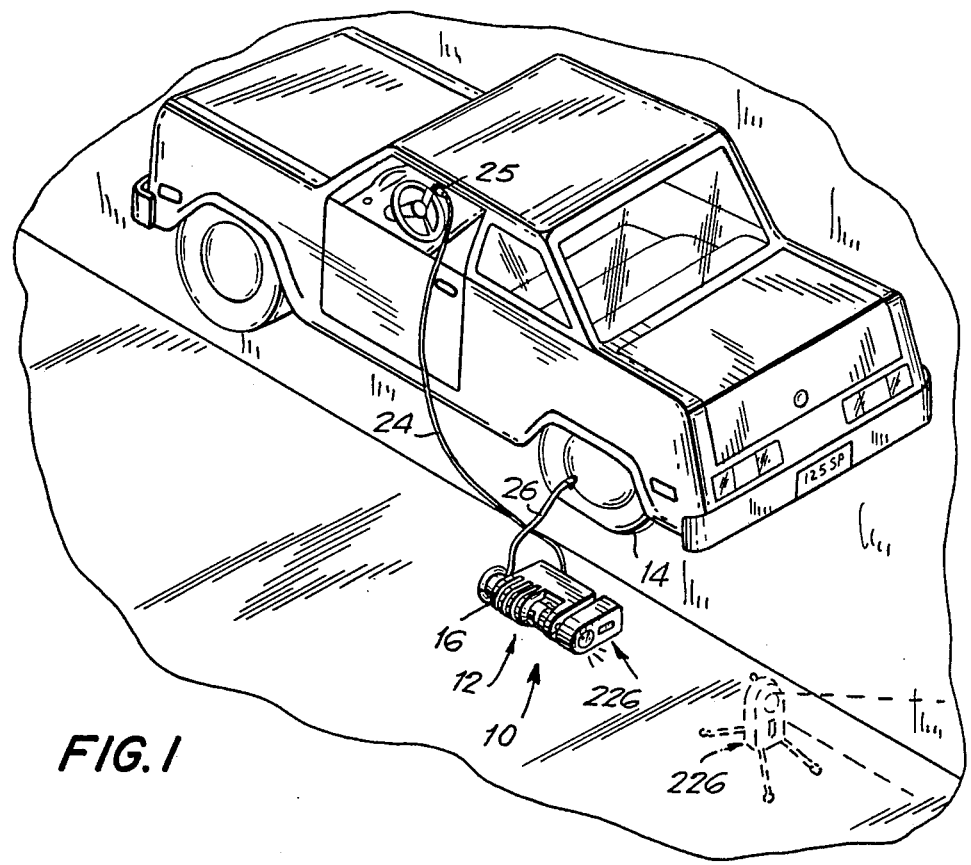
FIG. 1 is a perspective of a portable air pump assembly and detachable safety lamp according to the present invention, in use with an automobile.

Referring to the drawings in detail, and initially to FIG. 1 thereof, a portable air compressor and detachable safety lamp assembly 10 according to the present invention includes an air pump assembly 12 for supplying pressurized air to inflate a tire 14 of an automotive vehicle. Air pump assembly 12 includes a small portable housing 16 which houses an air compressor 18 for supplying the pressurized air. Housing 16 is constructed from an upper casing 16a and a lower casing 16b, which when secured together by suitable bolts or the like, form an enclosure that houses air compressor 18.

Figure 3:
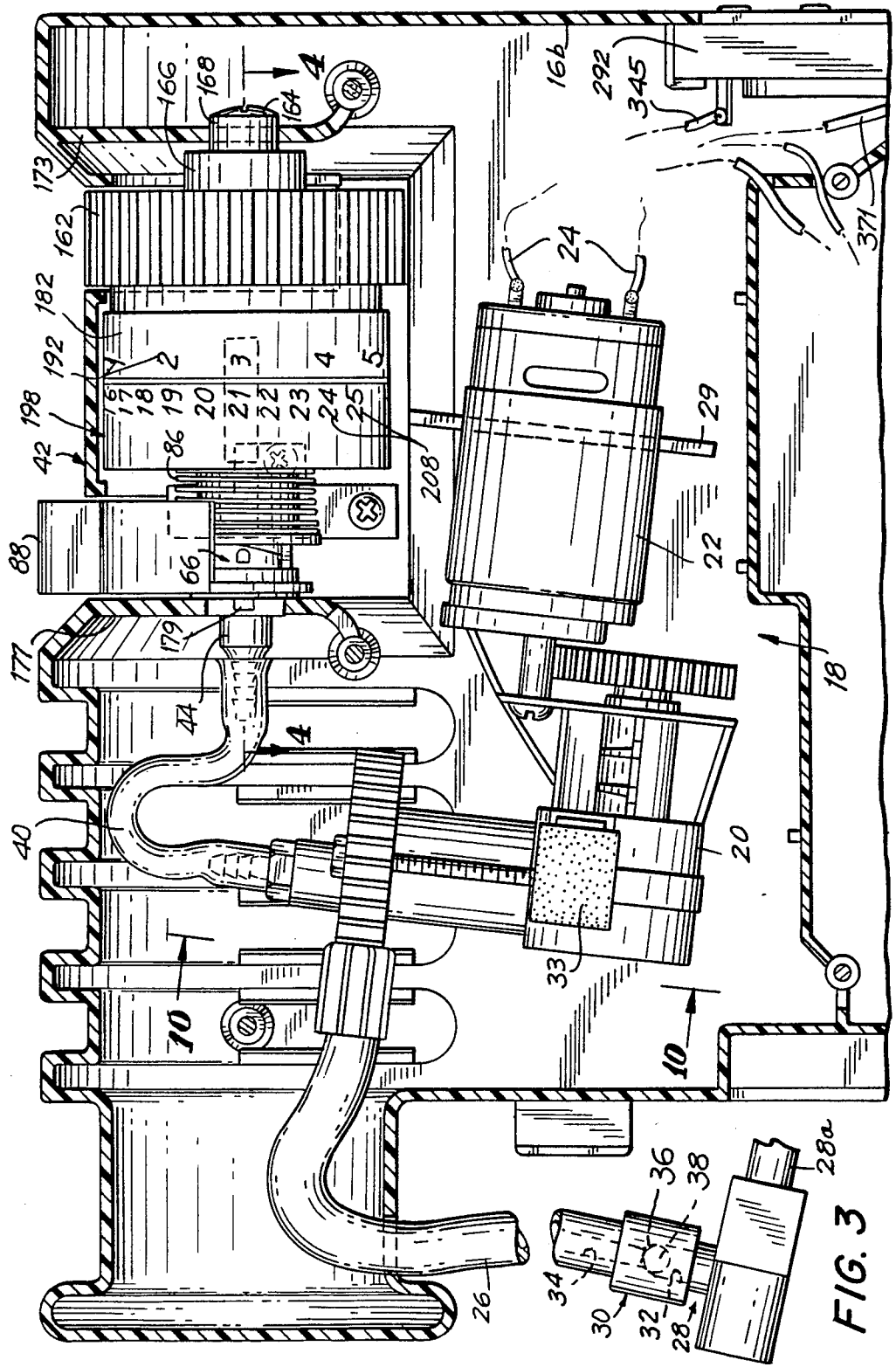
FIG. 3 is a cross-sectional view of the air pump assembly of FIG. 2, taken along line 3—3 thereof.

As shown best in FIG. 3, air compressor 18 includes an air pump 20 that is driven by an air pump motor 22 to produce pressurized air. Motor 22 is energized by the vehicle's battery (not shown), which is conventionally a 12-volt battery, through electrical lines 24 having an adapter 25 at the free ends thereof that plugs into the vehicle's cigarette lighter. As an example of a similar arrangement that can be used, reference is made to U.S. Pat. No. 4,614,479. Thus, there are two electrical lines 24 for supplying power to air compressor 18. In addition, there is a third electrical line 23, shown in FIG. 21, which supplies power to an LED 27 that is secured to the adapter and extends out of the cigarette lighter of the vehicle. Thus, when the tire has been inflated, and the air compressor 18 turned off, the LED lights up to indicate to the driver that inflation to the preset pressure has occurred. Thus, the driver can remain in the vehicle while tire 14 is being inflated, and can automatically determine when inflation has ended, since the driver may not hear the shut off of the compressor 18 over the noise of the vehicle's engine.

Air pump motor 22 is seated on C-shaped supports 29 on the upper and lower casings 16a and 16b. In addition, as shown in FIGS. 3 and 10, wing supports 31 are secured to air pump 20, and rubber shock absorbing members 33 are connected between wing supports 31 and recesses 35 provided in the upper and lower casings 16a and 16b for securing air pump 20 in housing 16 in a substantially shock resistant manner.

An air supply line 26 is connected to the outlet of air pump 20, air supply line 26 having an enlarged head 28 attached to the free end thereof, with a nipple 28a connected with enlarged head 28 for connection with the valve (not shown) of a tire so as to supply pressurized air thereto. A one way ball valve 30 is provided in enlarged head 28 for permitting the supply of pressurized air from air supply line 26 to the tire, but not from the tire back to air supply line 26. Specifically, one way ball valve 30 includes an air passage 32 in enlarged head 28, air passage 32 terminating in a reduced diameter air passage or restriction 34 so that a shoulder 36 is defined between air passage 32 and restriction 34. A ball 38 is freely movable within air passage 32. Thus, when the pressure of the air in air supply line 26 is greater than the air pressure in tire 14, ball 38 is moved away from shoulder 36 to permit the entry of pressurized air from air supply line 26 to the tire. On the other hand, when the pressure of the air in air supply line 26 is less than the air pressure in the tire, ball 38 is moved by the tire pressure into contact with shoulder 36 to block the entry of pressurized air from air supply line 26 to the tire. Thus, one way ball valve 30 prevents loss of pressure in the tire after it has been inflated to the desired pressure.

Figure 4:
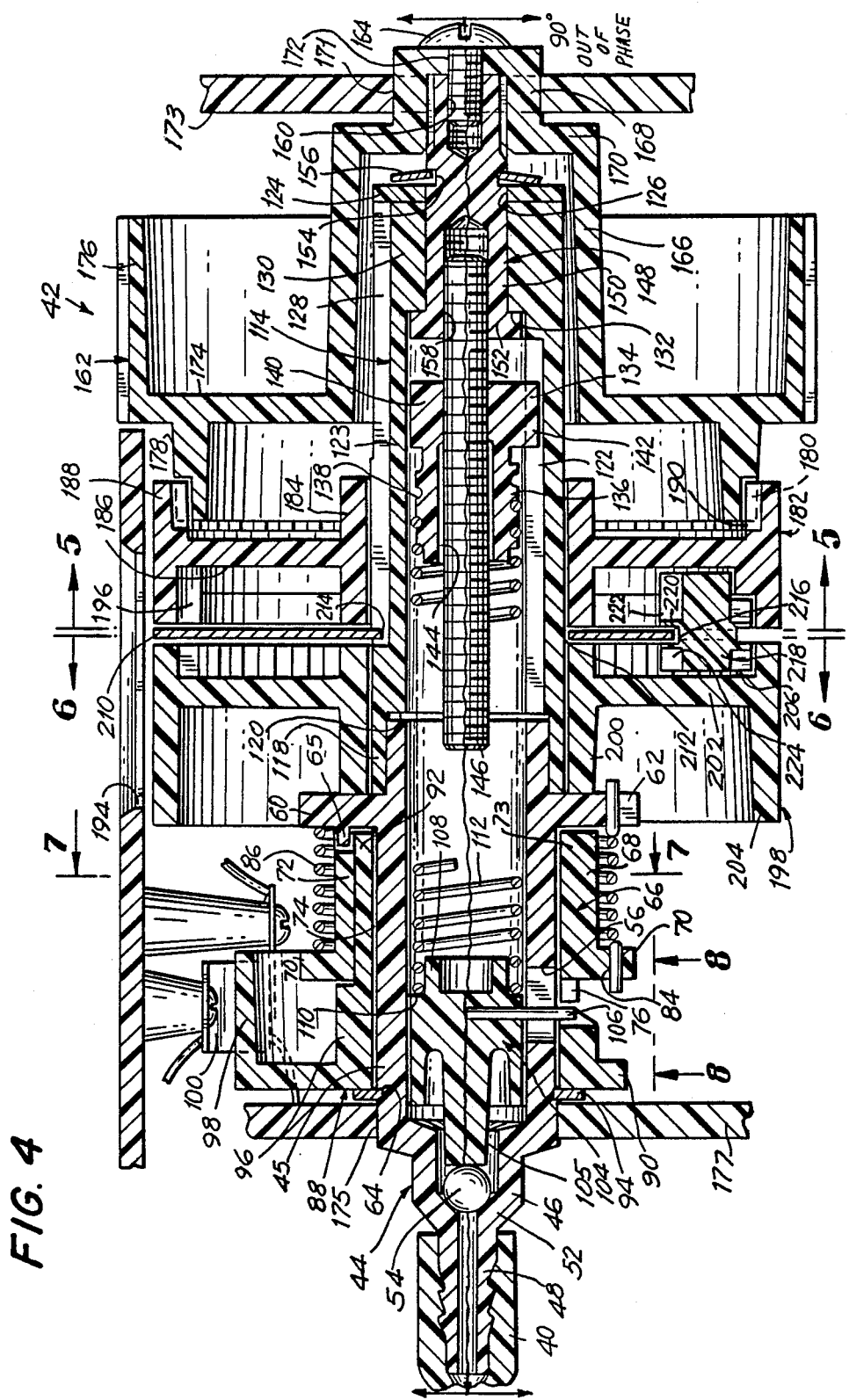
FIG. 4 is a cross-sectional view of the air pump assembly of FIG. 3, taken along line 4—4 thereof, and with the lower half being a cross-section which is 90 degrees offset from the upper half.
Figure 20:
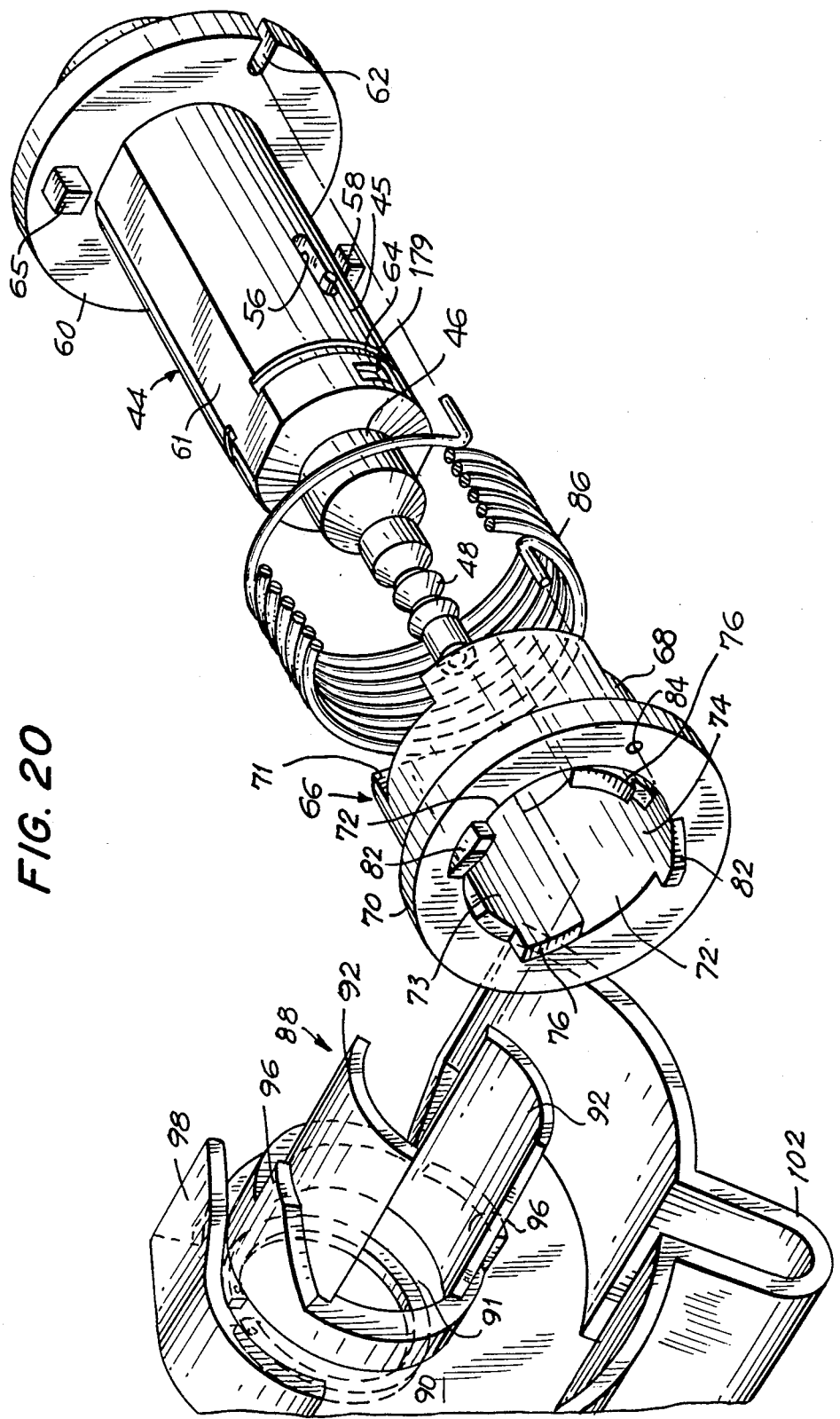
FIG. 20 is a blown-apart, perspective view of a portion of the pressure limit switch of the air pump assembly of FIG. 2.

Referring now to FIGS. 3 and 4, a bypass air line 40 is also connected with the outlet of air pump 20, and is connected at its opposite end to a pressure limit switch 42, shown in cross-section in FIG. 4 and parts shown in perspective in FIG. 20, and which is also contained within housing 16. Pressure limit switch 42 is designed to permit the user to preset the desired pressure of inflation. When the tire is inflated to such preset pressure, pressure limit switch 42 deactivates air pump motor 22.

Specifically, pressure limit switch 42 includes a hollow front valve body 44 formed by a tubular section 45, and a narrow neck 46 at the forward end of tubular section 45 which terminates in a reduced diameter nipple 48 that fluidly connects the opposite end of bypass air line 40. Thus, an annular shoulder 52 is formed between narrow neck 46 and nipple 48. In accordance with the present invention, a ball 54 is positioned within narrow neck 46, and is normally biased into contact with shoulder 52 by a preset force, as will be discussed in greater detail below, so as to prevent the supply of pressurized air from bypass air line 40 through front valve body 44. When the tire pressure is equal to or greater than the preset pressure, ball 54 is displaced from shoulder 52 to deactivate air pump motor 22.

As will be appreciated from the discussion which follows, front valve body 44 also includes diametrically opposite longitudinal slots 56 in tubular section 45 and two outwardly radially extending projections 58, each adjacent to a slot 56 and circumferentially in line therewith, as shown in FIGS. 4, 8 and 20. Further, front valve body 44 includes a circumferential flange 60 at the rear of tubular section 45, flange 60 having a spring engaging slot 62, starting at the outer periphery of flange 60 and extending inwardly radially for a short distance. Tubular section 45 of front valve body 44 is also formed with diametrically opposite flat sections 61 extending along the entire length thereof, and is formed with a circumferential groove 64 at the end thereof which is connected with narrow neck 46.

A switch trigger 66 is slidably and rotatably received over tubular section 45 of front valve body 44. Switch trigger 66 includes a tubular section 68 having an annular flange 70 at one end thereof. The opposite end of tubular section 68 has two diametrically opposite cutout sections 71 which fit over diametrically opposite axial projections 65 extending inwardly from flange 60 of front valve body 44. Tubular section 68 also has diametrically opposite, reduced thickness portions 72 extending axially therealong, as shown in FIGS. 4 and 20, so as to define axial gaps 74 between the outer surface of tubular section 45 of front valve body 44 and the inner surface of the reduced thickness portions 72 of tubular section 68. As a result, diametrically opposite thick portions 73 are defined axially therealong, between reduced thickness portions 72.

In addition, switch trigger 66 includes diametrically opposite catches 76 extending axially outward from annular flange 70 thereof, as best shown in FIGS. 8 and 20. Each catch 76 includes a ramp 78 which terminates in a catch surface 80, as best shown in FIG. 8. Specifically, catch surface 80 is designed to catch a radially extending projection 58 on tubular section 45 of front valve body 44. Switch trigger 66 also includes diametrically opposite release ramps 82, as shown in FIGS. 9, 9A and 20, each of which also extends axially outwardly from annular flange 70, with catches 76 and release ramps 82 being spaced approximately 90 degrees out of phase with respect to each other about flange 70. Annular flange 70 is also formed with a hole 84 near the periphery thereof.

A torsion spring 86 is wrapped about tubular section 68 of switch trigger 66, between circumferential flange 60 of front valve body 44 and annular flange 70 of switch trigger 66. One end of torsion spring 86 is secured in hole 84 of annular flange 70, and the opposite end of torsion spring 86 is secured in spring engaging slot 62 in flange 60 of front valve body 44. Thus, torsion spring 86 normally causes rotation of switch trigger 66 about tubular section 45 of front valve body 44. However, the angular rotation of switch trigger 66 about tubular section 45 is limited to a small arc, and the manner of limiting such rotation of switch trigger 66 will be discussed later. Torsion spring 86 also normally biases switch trigger 66 axially along tubular section 45 of front valve body 44 in a direction away from flange 60.

A switch knob 88 is also rotatably mounted on tubular section 45 of front valve body 44, but is axially immovable thereon. Specifically, switch knob 88 includes an annular flange 90 defining a central aperture 91 by means of which switch knob 88 is positioned over tubular section 45 of front valve body 44. Switch knob 88 has two uniform thickness, diametrically arcuate sections 92 extending axially from annular flange 90 immediately about aperture 91 such that arcuate sections 92 are normally positioned in axial gaps 74 between the outer surface of tubular section 45 of front valve body 44 and the inner surface of tubular section 68 of switch trigger 66, that is, each arcuate section 92 extends below a respective reduced thickness portion 72 and between the two thick portions 73 of switch trigger 66. Thus, when switch knob 88 is rotated about front valve body 44, arcuate sections 92 abut against respective ends of thick portions 73 and thus rotate switch trigger 66. In effect, switch trigger 66 and switch knob 88 are effectively rotatably locked together. However, it is important to note that the arcuate length of each arcuate section 92 is slightly less than that of the respective reduced thickness portion 72, so that upon rotation of switch knob 88, arcuate sections 92 first begin to rotate over a very small angle, and then when arcuate sections 92 abut against the thicker portions 73, both switch knob 88 and switch trigger 66 rotate together.

Further, the free ends of arcuate sections 92 extend into, or substantially into, contact with flange 60 of front valve body 44. In this position, the outer face of annular flange 90 extends just inwardly of circumferential groove 64. Accordingly, a C-ring washer 94 is positioned within groove 64 and thereby prevents axial movement of switch knob 88 on tubular section 45 of front valve body 44, and also prevents removal of switch knob 88 therefrom. However, because the free ends of arcuate sections 92 are not in tight contact with flange 60, rotation of switch knob 88 about front valve body 44 is permitted.

Switch knob 88 also includes an actuating ramp 96 on each arcuate section 92 near the connection thereof to flange 90, actuating ramp 96 being in contact with release ramp 82 of switch trigger 66 during all stable conditions of switch trigger 66. Thus, since switch trigger 66 is normally biased axially away from flange 60 by torsion spring 86, and since switch knob 88 is axially fixed on front valve body 44, actuating ramps 96 function in one respect to limit the axial movement of switch trigger 66 on front valve body 44.

Figure 2:
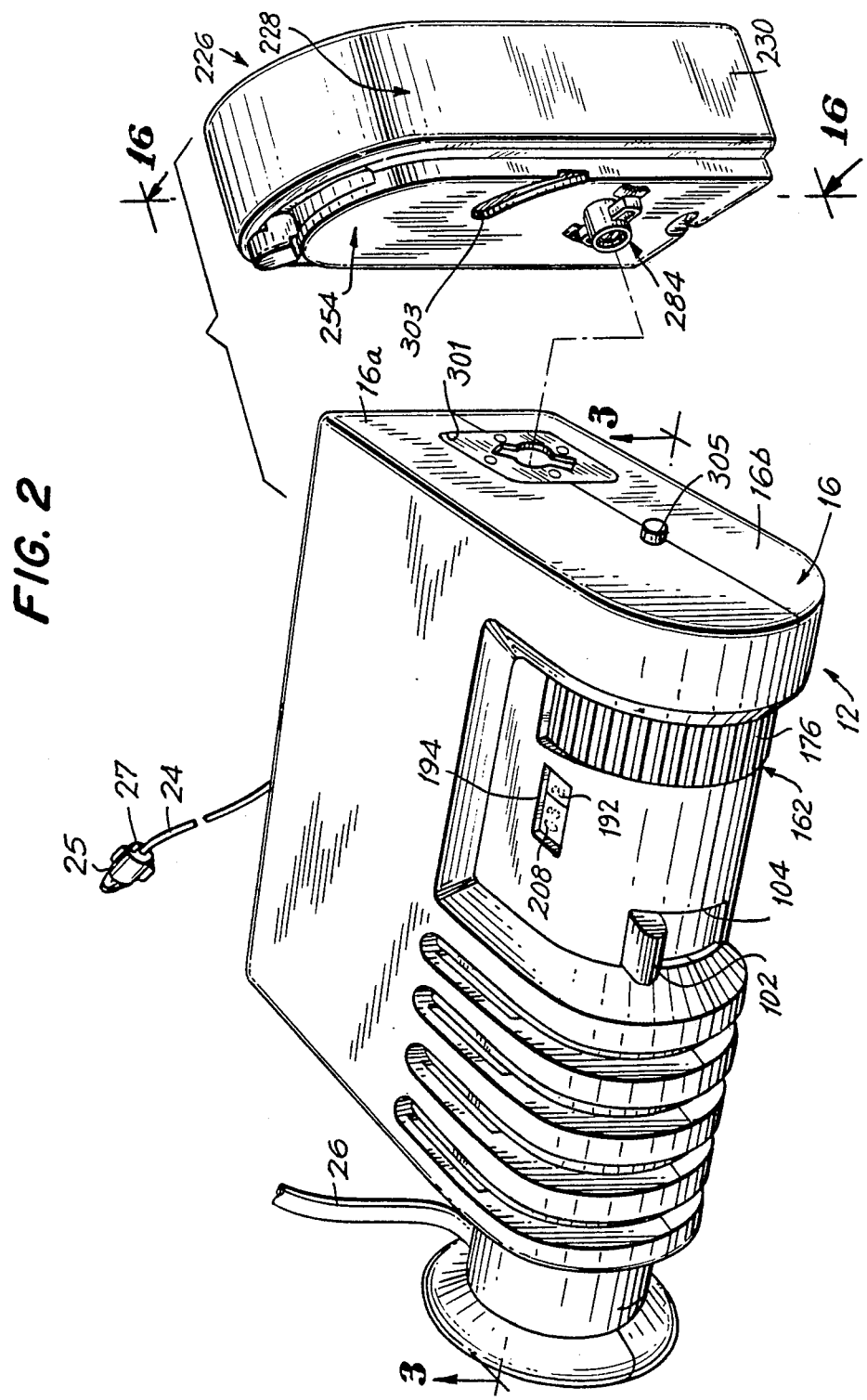
FIG. 2 is a perspective view of the portable air pump assembly and safety lamp of FIG. 1 in a separated condition.

Further, as shown in FIGS. 4, 7 and 20, switch knob 88 includes an outer cam surface 98 secured to the periphery of flange 90. Cam surface 98 is adapted to engage and close two electrical contacts 100 when appropriately rotated. When the two electrical contacts 100 are closed, the electric circuit to air pump motor 22 is completed, so that current is supplied to the latter to pump pressurized air to tire 14. When switch knob 88 is rotated so that electrical contacts 100 are not closed, air pump motor 22 is deactivated. In order to rotate switch knob 88, the latter includes an actuating lever 102 at the outer periphery of flange 90, with actuating lever 102 extending out through a slot 104 in upper casing 16a, as shown in FIGS. 2 and 7.

Thus, when the user desires to actuate air compressor 18, actuating knob 102 is pushed downwardly, so as to rotate switch knob 88 about front valve body 44. Since switch knob 88 is effectively rotatably coupled with switch trigger 66, as aforementioned, switch trigger 66 is also rotated about front valve body 44. During such rotation, projections 58 on tubular section 45 of front valve body 44 ride up on ramps 78 of catches 76. Accordingly, since projections 58 are stationary, switch trigger 66 is forced inwardly toward flange 60 of front valve body 44, against the force of torsion spring 86. As soon as projections 58 pass the upper ends of ramps 78, torsion spring 86 biases switch trigger 66 back away from flange 60, such that projections 58 are caught against catch surfaces 82 of catches 78. Accordingly, switch knob 88 is maintained in this rotated position. In this position, cam surface 98 closes electrical contacts 100, so that air pump motor 22 is actuated and starts supplying pressurized air to air supply line 26, and in turn, to tire 14, or any other device which is to be inflated.

In order to release projections 58 from catch surface 82 so that torsion spring 86 rotates switch trigger 66, and thereby also switch knob 88, back to the unactivated position, the user can merely push actuating knob 102 of switch knob 88 upwardly. As a result, switch knob 88 begins to rotate slightly by itself, without a consequent rotation of switch trigger 66. This is because, as aforementioned, there is some play of arcuate sections 92 between thicker portions 73. Accordingly, actuating ramps 96 force release ramps 82 to ride thereon. This, in turn, biases switch trigger 66 inwardly against the force of torsion spring 86 and toward flange 60 of front valve body 44. As a result, projections 58 are no longer held by catch surfaces 80 of catches 78, whereupon torsion spring 86 rotates switch trigger 66 back to its original unactivated position. During the reverse rotation of switch trigger 66, projections 58 ride down ramps 80 of catches 78, and torsion spring 86 biases switch trigger 66 axially away from flange 60 of front valve body 44. Further, since switch knob 88 has been rotated, cam surface 98 no longer closes electrical contacts 100. Because of the leaf spring nature of such electrical contacts 100, they resume their original, open positions, so that air pump motor 22 is deactivated.

In accordance with the present invention, deactivation of air pump motor 22 also occurs when tire 14 is inflated to a preset pressure, and this aspect of pressure limit switch 42 will now be discussed.

Specifically, a piston 104 is slidably fit within tubular section 45 of front valve body 44, and has a centrally located projection 105 on the side thereof facing nipple 48, which contacts ball 54 and biases it against shoulder 52, as shown in FIG. 4. A pin 106 extends diametrically through piston 104, with opposite ends thereof extending through longitudinal slots 56 in tubular section 45 of front valve body 44. Further, the opposite end of piston 104 has a reduced diameter boss 108 thereon so as to define an annular seat 110. A compression spring 112 has one end in surrounding relation to boss 108 and is seated on seat 110 to apply a biasing force to piston 104 so that projection 105 normally biases ball 54 against shoulder 52 in the unactivated condition of the apparatus.

The pressure of compression spring 112 on piston 104 is variable in accordance with a preset desired inflation pressure. Thus, for example, if the pressure of compression spring 112 is adjusted to correspond to a desired inflation pressure of 32 psi, when tire 14 has been inflated to such preset pressure of 32 psi, the pressurized air from air pump 20 traveling through bypass air line 40, and into nipple 48 of front valve body 44, has reached a high enough pressure to move ball 54 to the right of FIG. 4, against the force of compression spring 112 to cause a deactivation of the compressor as will now be discussed.

The displacement of ball 54 to the right permits the pressurized air to act against piston 104, causing the latter, as well as pin 106 therein, to travel to the right of FIG. 4, with the ends of pin 106 moving within longitudinal slots 56 of tubular section 45 of front valve body 44.

It will be appreciated that, when switch trigger 66 has been rotated to its active position such that projections 58 are held by catches 78, the ends of pin 106 are in contact with and at the centers of ramps 80 of catches 78. Thus, movement of pin 106 to the right of FIG. 4, results in the ends of pin 106 biasing ramps 80, and thereby also switch trigger 66, to the right of FIG. 4. At such time, since projections 58 are no longer held by catch surfaces 80 of catches 78, torsion spring 86 rotates switch trigger 66 back to its original unactivated position. During the reverse rotation of switch trigger 66, projections 58 ride down ramps 80 of catches 78, and torsion spring 86 biases switch trigger 66 axially away from flange 60 of front valve body 44. Since switch trigger 66 is effectively rotatably coupled with switch knob 88, the latter is rotated with switch trigger 66. Since switch knob 88 has been rotated, cam surface 98 no longer closes electrical contacts 100. Because of the leaf spring nature of such electrical contacts 100, they resume their original, open positions, so that air pump motor 22 is deactivated. Accordingly, as soon as the desired preset pressure is attained, air compressor 18 is deactivated to prevent overinflation of tire 14 beyond the preset pressure.

The portion of pressure limit switch 40 that is provided to preset the pressure on compression spring 112 will now be discussed.

As shown in FIG. 4, the rear portion of tubular section 45 of front valve body 44 is force fit within a rear valve body 114. Specifically, rear valve body 114 is formed with a tubular section 116 which has its inner wall cut out to define a reduced thickness section 118 at one end thereof. As a result, an outwardly directed annular shoulder 120 is defined in the inner wall of tubular section 116 by the reduced thickness section 118. Although not shown, a notch can be formed in the end face of reduced thickness section 118 which receives a tab on the rearward face of flange 60 when reduced thickness portion 116 is press fit over the rear portion of tubular section 45 of front valve body 44. In this manner, front valve body 44 and rear valve body 114 are rotatably fixed with each other.

The inner wall of tubular section 116 is also reduced in thickness to form two diametrically opposite linear passageways 122, the latter being bounded by portions 123 of tubular section 116 which have not had their inner walls reduced in thickness, and which extend on opposite sides of each passageway 122. Tubular section 116 is also formed with an end wall 124 at the end opposite reduced thickness section 118, end wall 124 having a central aperture 126 therein. Further, tubular section 116 is formed with a longitudinal groove 128 extending along the outer surface thereof for the same length as the passageways 122, and being offset from the passageways 122 by 90 degrees. In addition, tubular section 116 is formed with an increased thickness section 130 extending from end wall 124 and extending slightly inwardly therefrom, whereby an inwardly directed annular shoulder 132 is formed.

Figure 5:
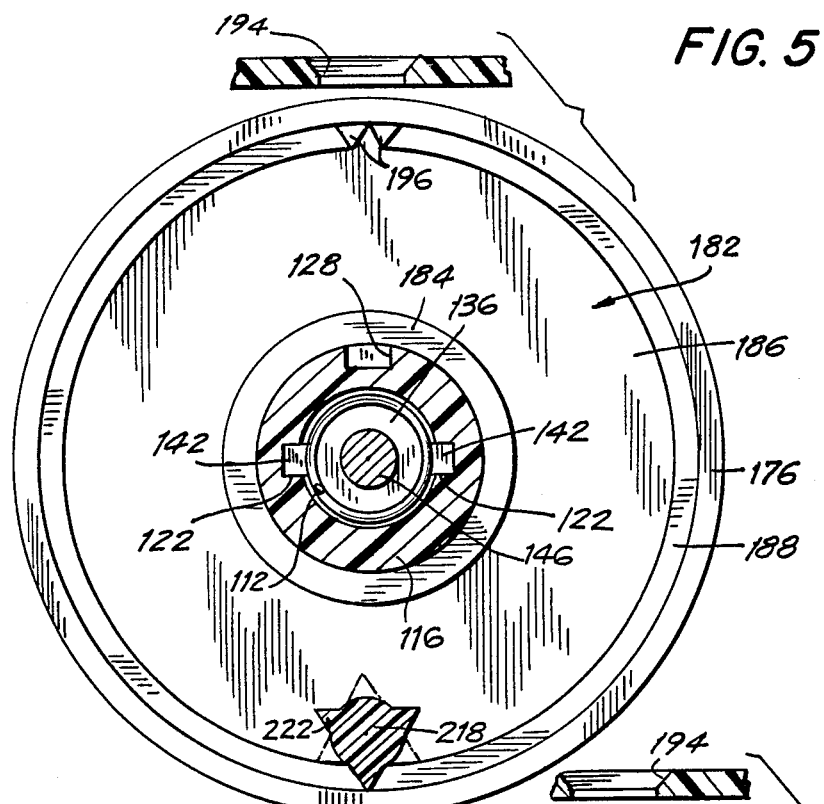
FIG. 5 is a cross-sectional view of the air pump assembly of FIG. 4, taken along line 5—5 thereof.

A nut 134 is slidably received in tubular section 116 of rear valve body 114. Specifically, nut 134 includes a shaft 136 having helical threads 138 along the outer surface thereof, and an enlarged head 140 integrally formed with shaft 136. The opposite end of compression spring 112 is screwed onto the helical threads 138 to secure such end of compression spring 112 onto shaft 136. Two diametrically opposite slide projections 142 are formed on enlarged head 140, and fit within passageways 122 so that nut 134 is non-rotatably slidable within tubular section 116 of rear valve body 114, as shown in FIGS. 4 and 5. Further, a central screw-threaded bore 144 is formed through nut 134, and a screw-threaded shaft 146 is screw-threadedly received within bore 144. Thus, a screw-threaded shaft 146 is rotated, nut 134 is moved axially within rear valve body 114. As a result, the force applied by compression spring 112 on piston 104 is varied.

The opposite end of screw-threaded shaft 146 is fixed within a screw hub 148 that is axially fixed, but rotatable, within the increased thickness section 130 of tubular section 116. Specifically, screw hub 148 includes a shaft 150 positioned within increased thickness section 130 and extending through central aperture 126 in end wall 124, and an enlarged head 152 secured to shaft 150 and positioned within the main body of tubular section 116 so that enlarged head 152 normally abuts against inwardly directed annular shoulder 132 so as to prevent the escape of screw hub 148 through end wall 124 of tubular section 116. A circumferential groove 154 is formed in the outer wall of shaft 150 at a position where shaft 150 extends out of tubular section 116, and a C-ring 156 is fit within groove 154 so as to prevent axial movement of screw hub 148 into tubular section 116. In this manner, screw hub 148 is axially fitted in tubular section 116, but is permitted to rotate therein. A central aperture 158 is formed through enlarged head 152 and extends partially into shaft 150, and the opposite end of screw-threaded shaft 146 is fixedly secured therein. The free end of shaft 150 includes a central, screw-threaded aperture 160.

A control knob 162 is fixed to screw hub 148 by a screw 164. As shown in FIGS. 3 and 4, control knob 162 includes a tubular section 166 in surrounding relation to rear valve body 114. The rear end of tubular section 166 has a reduced end cap 168 integrally formed therewith through an annular connecting wall 170. End cap 168 has a central aperture 172 therein through which screw 164 is inserted and then received in screw-threaded aperture 160 in screw hub 148, so as to fixedly tighten control knob 162 onto screw hub 148. Thus, as control knob 162 rotates, screw hub 148 likewise rotates.

Before proceeding further with a description of control knob 162, it is noted that pressure limit switch 42 is supported in housing 16 by means of control knob 162 and front valve body 44. Specifically, end cap 168 is rotatably cradled in semi-circular shaped recesses 171 formed in support walls 173 of upper and lower casings 16a and 16b of housing 16. In like manner, the forward end of tubular section 45 of front valve body 44 is cradled in semi-circular shaped recesses 175 formed in parallel support walls 177 of upper and lower casings 16a and 16b, respectively, of housing 16. Recesses 175 form a circular aperture which holds front valve body 44. However, front valve body 44 is not rotatable in recesses 175. This is accomplished by forming diametrically opposite notches 179 in the portion of tubular section 45 that fits within recesses 175 and forming corresponding tabs (not shown) in recesses 175 that fit within notches 177, so as to prevent rotation of front valve body 44 in recesses 175.

Returning now to control knob 162, control knob 162 includes an annular radially directed flange 174 formed at the opposite end of tubular section 166, and a first annular axially directed flange 176 integrally formed at the outer periphery of flange 174 and extending in a direction toward end cap 168. The outer surface of flange 176 extends partially out of upper casing 16a of housing 16, and is adapted to be finger turned by a user. A second annular axially directed flange 178 extends from flange 174 at a smaller radial distance than flange 176 and in the opposite axial direction. Gear teeth 180 are formed on the outer surface of flange 178 at the free annular edge thereof.

A ones digit counter wheel 182 is also rotatably mounted on rear valve body 114, and has an I-shaped cross-section, as shown in FIGS. 4 and 5. Counter wheel 182 includes an inner tubular section 184 in rotatable surrounding relation to tubular section 116 of rear valve body 114. An annular plate section 186 is connected to the outer surface of inner tubular section 184 and extends radially outwardly therefrom, and an outer tubular section 188 is connected substantially centrally to the outer periphery of annular plate section 186. The inner surface of outer tubular section 188 that extends to the right of annular plate section 186 in FIG. 4, is formed with gear teeth 190 extending around the entire circumference thereof. The inner diameter of outer tubular section 188 is slightly larger than the outer diameter of second annular axially directed flange 178 of control knob 162, so that flange 178 fits within outer tubular section 188 such that gear teeth 180 and 190 are in meshing relation. As a result, control knob 162 and counter wheel 182 are rotatably coupled together, that is, when control knob 162 is rotated, counter wheel 182 is rotated therewith. The outer surface of outer tubular section 188 also has numbers 192 thereon, ranging from 0 to 9, and which are visible through a window 194 in upper casing 16a of housing 16, as shown in FIG. 2. In addition, the annular end of outer tubular section 188 which is opposite gear teeth 190, contains two adjacent gear teeth 196, as shown best in FIG. 5.

Figure 6:
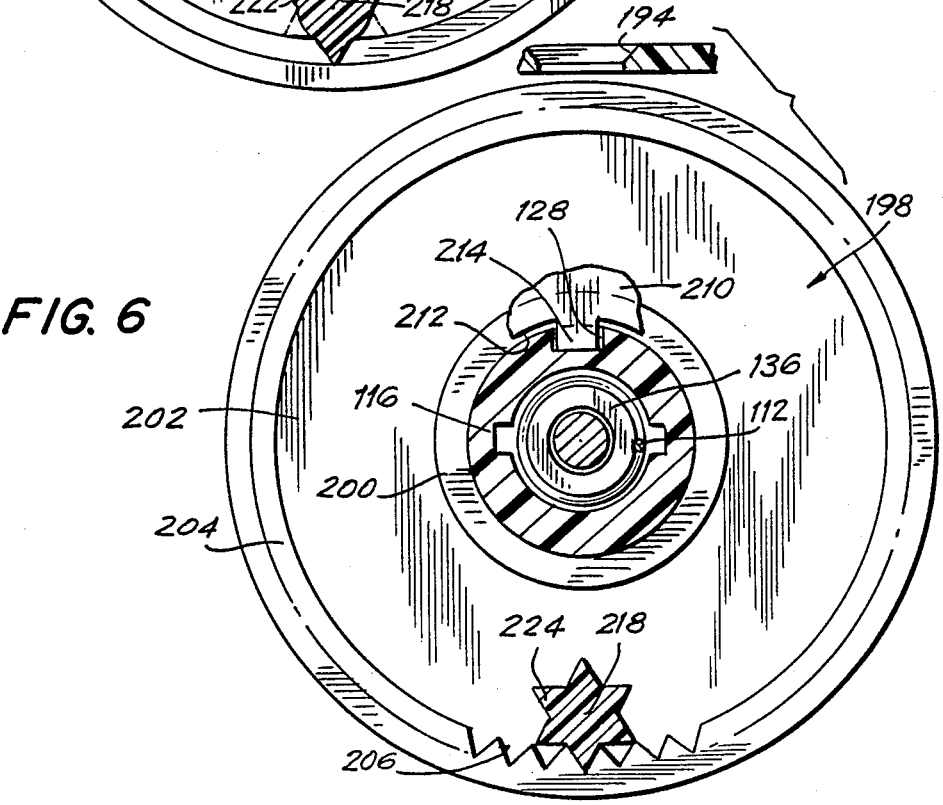
FIG. 6 is a cross-sectional view of the air pump assembly of FIG. 4, taken along line 6—6 thereof.
Figure 14:
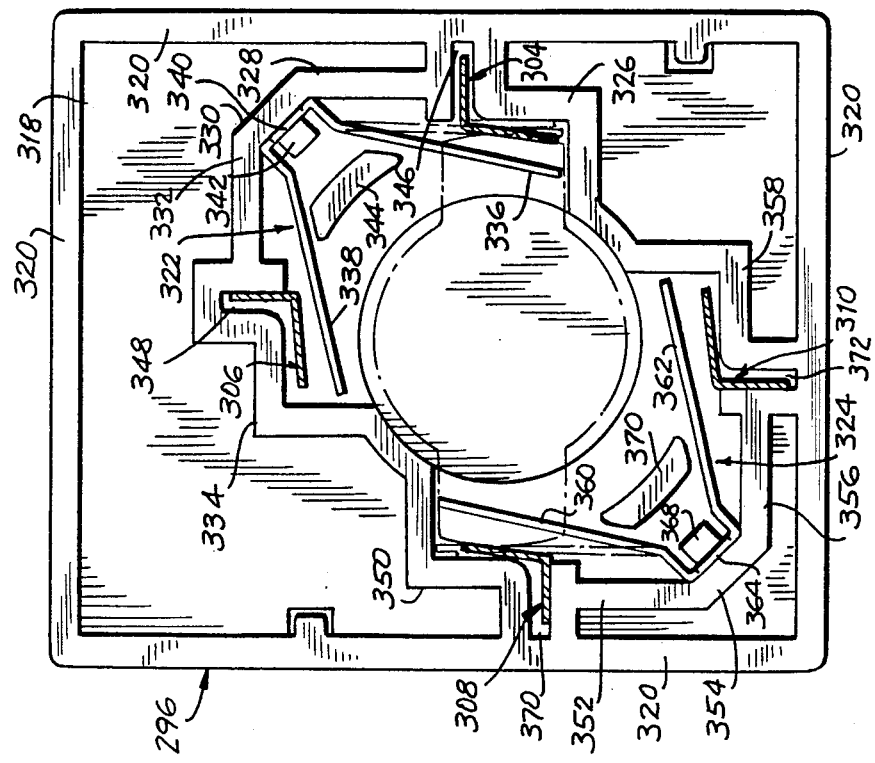
FIG. 14 is a cross-sectional view of the connector of FIG. 11, taken along line 14—14 thereof.

A tens digit counter wheel 198, shown in FIGS. 4 and 6, is also rotatably mounted on tubular section 116 of rear valve body 114 immediately adjacent counter wheel 182. Counter wheel 198 is also formed with an inner tubular section 200 in rotatable surrounding relation to tubular section 116 of rear valve body 114. An annular plate section 202 is connected to the outer surface of inner tubular section 200 and extends radially outward therefrom, and an outer tubular section 204 is connected substantially centrally to the outer periphery of annular plate section 202. The inner surface of outer tubular section 204 that extends to the right of annular plate section 202 in FIG. 4, is formed with gear teeth 206 extending around the entire circumference thereof. The inner diameter of outer tubular section 188 of counter wheel 182 is the same as the inner diameter of outer tubular section 204 of counter wheel 198. The outer surface of outer tubular section 204 also has numbers 208 thereon, ranging from 0 to 25, and which are visible through the same window 194 in upper casing 16a of housing 16.

A carrier 210 in the form of a flat circular metal plate is positioned between counter wheels 182 and 198, and is in surrounding relation to tubular section 116 of rear valve body 114. Thus, carrier 210 has a central hole 212 through which tubular section 116 extends. Carrier 210 includes a tab 214 that extends down into central hole 212, and is positioned within longitudinal groove 128 in the external surface of tubular section 116. Accordingly, carrier 210 is not rotatable about rear valve body 114. Carrier 210 also includes a radial slot 216 that extends from the outer periphery thereof radially inward for a short distance.

A pinion gear 218 is rotatably positioned in radial slot 216. Specifically, pinion gear 218 includes a circumferential groove 220 that permits rotational positioning of pinion gear 218 in radial slot 216. In this manner, pinion gear 218 includes a first set of gear teeth 222 on one side of groove 220, that is, to the right of groove 220 in FIG. 4, and a second set of gear teeth 224 on the other side of groove 220, that is, to the left of groove 220 in FIG. 4. Gear teeth 222 are in meshing engagement with gear teeth 196 of counter wheel 182, and gear teeth 224 are in meshing engagement with gear teeth 206 of counter wheel 198.

It will be appreciated that since there are only two gear teeth 196, gear teeth 222 of pinion gear 218 only engage gear teeth 196 of counter wheel 182 once during each revolution of counter wheel 182. Thus, each time that counter wheel 182 is rotated 360 degrees, gear teeth 196 of counter wheel 182 engage gear teeth 222 of pinion gear 218. However, gear teeth 224 of pinion gear 218 are always in meshing relation with gear teeth 206 of counter wheel 198. Thus, during each engagement of gear teeth 196 and 222, pinion gear 218 is rotated a small angle. As a result, gear teeth 224 are also rotated by the same small angle, and in turn, rotate counter wheel 198 by means of gear teeth 206 thereof.

Counter wheels 182 and 198 are used to preset the aforementioned desired air pressure at which automatic shut-off of air compressor 18 occurs. Thus, when control knob 162 is rotated by the user, ones digit counter wheel 182 is also rotated therewith. During the rotation of counter wheel 182, the numbers 192 on counter wheel 182 are viewed through window 194 by the user. After each revolution of counter wheel 182, counter wheel 198 is rotated a small angle therewith by means of pinion gear 218. Thus, for example, starting with counter wheels 182 and 198 both set at "0", as control knob 162 is rotated, numbers 192 on counter wheel 182 also rotate past window 194, from number 0 to number 9. When counter wheel 182 is rotated past the number 9 to the number 0, pinion gear 218 causes a small angle rotation of counter wheel 198, so that the number 1 on counter wheel 198 now appears through window 194, and so on, with the viewed number on counter wheel 198 increasing or decreasing with each revolution of counter wheel 182, depending upon the direction of rotation of the latter. Thus, the present invention envisions pressure settings from 0 to 259 psi, although the present invention is not limited by these numbers.

In basic operation, control knob 162 is rotated until the desired combination of tens number 208 and ones number 192 is reached, corresponding to the desired air pressure for inflation. During rotation of control knob 162, screw hub 148 is also rotated. This, in turn, causes rotation of screw-threaded shaft 146 and consequent axial movement of nut 134 in rear valve body 114. This, in turn, compresses compression spring 112, which applies a greater force on piston 104 and therefore on ball 54. In other words, a greater air pressure must be applied through nipple 48 of front valve body 44 to move ball 54 away from shoulder 52 as the pressure setting is increased.

Thus, after the desired air pressure has been set, the user actuates air compressor 18 by pushing actuating lever 102 downwardly, so as to rotate switch knob 88 about front valve body 44. As a result, switch trigger 66 is also rotated about front valve body 44. During such rotation, projections 58 on tubular section 45 of front valve body 44 ride up on ramps 78 of catches 76, and are then caught against catch surfaces 82 of catches 78. Accordingly, switch lever 88 is maintained in this rotated position. In this position, cam surface 98 closes electrical contacts 100, so that air pump motor 22 is actuated and starts supplying pressurized air to tire 14.

When tire 14 has been inflated to the desired air pressure, the pressurized air from air pump 20 is re-routed through bypass air line 40 to nipple 48 of front valve body 44, and causes ball 54 to move away from shoulder 52. Accordingly, piston 104 is also moved to the right in FIG. 4. This results in pin 106 moving in longitudinal slots 56. This, in turn, biases switch trigger 66 inwardly against the force of torsion spring 86 and toward flange 60 of front valve body 44. As a result, projections 58 are no longer held by catch surfaces 80 of catches 78, whereupon torsion spring 86 rotates switch trigger 66 back to its original unactivated position. During the reverse rotation of switch trigger 66, projections 58 ride down ramps 80 of catches 78, and torsion spring 86 biases switch trigger 66 axially away from flange 60 of front valve body 44. Further, since switch knob 88 has been rotated, cam surface 98 no longer closes electrical contacts 100. Because of the leaf spring nature of such electrical contacts 100, they resume their original, open positions, so that air pump motor 22 is deactivated.

If the user desires to deactivate air compressor 18 prior to tire 14 being inflated to the desired air pressure, the user merely pushes actuating lever 102 of switch knob 88 upwardly. As a result, as aforementioned, air compressor 18 is shut off.

It will be appreciated from the above that air pump assembly 12 provides a novel operation heretofore not achieved in the prior art. Specifically, there are relatively few mechanically moving parts, thereby providing less room for malfunction. In addition, the parts that are moved, are moved in a reliable and stable manner, to ensure that there is no malfunction. Because of the few moving parts, the air pump assembly 12, and particularly, pressure limit switch 42 thereof, is very reliable in operation, and safe to use. Further, such air pump assembly 12 is easy and economical to manufacture and use.

Figure 12:
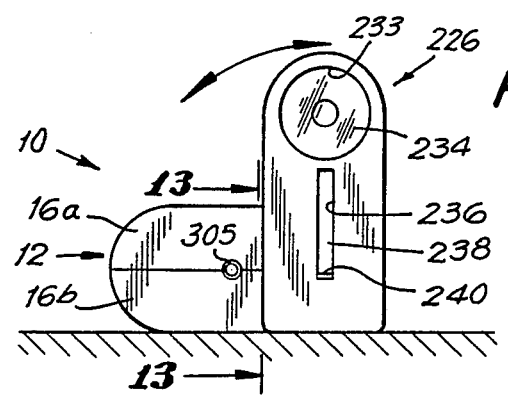
FIG. 12 is a plan view of the safety lamp attached to the air pump assembly housing and rotated to a vertical position.

As shown in FIGS. 1, 2 and 12, assembly 10 also includes a detachable safety lamp 226 that is operative in three different positions. Specifically, safety lamp 226 is operative in a horizontal position attached to housing 16, as shown by the solid lines in FIG. 1, in a vertical position attached to housing 16, as shown in FIG. 12, and in a vertical position which is detached from housing 16, as shown by the dashed lines in FIG. 1. When attached to housing 16, in the vertical or horizontal positions, safety lamp 226 is energized by the vehicle's battery through electrical lines 24, and when detached, by separate batteries contained in the housing 228 for safety lamp 226.

Specifically, housing 228 includes a casing 230 that is open at its entire rear surface. Casing 230 also includes a circular aperture 232 at its upper end on the front surface thereof, and which is covered by a lens 234 made of a transparent material such as plastic, glass or the like. In addition, casing 230 includes a slot 236 extending centrally of the front surface thereof and extending in the lengthwise direction of casing 230. A filter 238 is slidably positioned at the front of casing 230 with a slight friction fit and is movable behind lens 234 to provide a different color to the light emitted by safety lamp 226. In this regard, filter 238 extends downwardly along slot 236, and has a tab 240 integrally formed therein and which extends through slot 236. In this manner, the user can engage tab 240 and slide filter 238 up behind lens 234. It is noted that filter 238 is maintained in such position due to the slight friction fit thereof, as discussed above.

A lamp support 242 is secured in casing 230, and supports a light bulb 244 having an electrical contact 246 at the rear thereof, light bulb 244 being mounted in a reflector 248 formed as part of lamp support 242. Light bulb 244 and reflector 248 are positioned in back of circular aperture 232, so that when current is supplied to light bulb 244, white light shines out through circular aperture 232 and lens 234. If filter 238 is moved upwardly, a different color, such as red light, shines out through circular aperture 232. Lamp support also includes a post 250 at the lower end thereof, post 250 having a central screw-threaded bore 252 therein.

Housing 228 also includes a rear cover 254 that covers the open end of casing 230. Rear cover 254 includes a flat panel 256 that covers the opening of casing 230, and a side wall 258 integrally formed with panel 256 and which extends partially within casing 230. Flat panel 256 is formed with an aperture 260 centrally and at the lower end thereof, aperture 260 being in line with screw-threaded bore 252 of post 250 when flat panel 256 is in covering relation to the opening in casing 230. In this manner, when rear cover 254 is positioned in covering relation to the opening in casing 230, a screw 262 is inserted through aperture 260 of flat panel 256, and is screw-threadedly received in screw-threaded bore 252 of post 250 to secure rear cover 254 to casing 230.

An electric circuit board 264 is secured to the inside surface of flat panel 256, and includes various electrical circuitry components 265 therein for supplying either a constant current to light bulb 244 for continuously operating the same, or for supplying intermittent current to light bulb 244 to operate the same in a flashing mode, wherein light bulb 244 flashes, for example, three times every second or for another time period as may be desirable. An electrical contact 266, shown in FIG. 17, in the form of a resilient metal strip, is secured to circuit board 264, and is in electrical contact with electrical contact 246 of light bulb 244 when rear cover 254 is secured on casing 230. Electrical contact 266 is also connected with the electrical circuitry components 265 on circuit board 264, and is supplied with appropriate constant current, intermittent current or no current, depending upon the position of a control switch lever 268 which extends out of an opening 270 at the upper end of rear cover 254. Specifically, when control switch lever 268 is in the position shown in FIG. 17, no current is supplied to electrical contact 266; when in a middle position within opening 270, an intermittent current is supplied; and when in the other extreme end position within opening 270, a constant current is supplied.

Current can be supplied in two different ways. In a first way, first and second electrical contact strips 272 and 274 extend from circuit board 264 downwardly along the inside surface of flat panel 256, and out through apertures 276 in flat panel 256, where the ends 272a and 274a thereof are exposed at the outside surface of flat panel 256. When safety lamp 226 is secured with housing 16, as will be discussed hereinafter, the exposed ends 272a and 274a of electrical contact strips 272 and 274 are supplied with current from the vehicle's battery, that is, the same current supplied to air compressor 18.

In a second way, four electrical contacts are provided in two pair. Two C-cell or 1.5 volt batteries 275 are placed in series between each pair of electrical contacts. Specifically, a first pair of electrical contacts 278 and 280 are provided for two series arranged C-cell batteries. A second pair of electrical contacts includes an additional electrical contact 282 and the aforementioned electrical contact strip 272. Thus, if no current is supplied along electrical contact strip 274, the circuitry is supplied with current from the C-cell batteries 275. If current is supplied along contact strip 274, current is supplied from the vehicle's battery.

As previously described, a screw 262 extends through aperture 260 and screw-threaded bore 252 for securing rear cover 254 to casing 230. Specifically, as shown in FIGS. 16-19, a connector 284 is provided and has a central bore 286. Connector 284 is positioned on the outside surface of flat panel 256 so that central bore 286 thereof is in line with aperture 260 and screw-threaded bore 252. Thus, screw 262 is positioned within central bore 286 and aperture 260 and then screw-threadedly received with screw-threaded bore 252. Connector 284 is positioned centrally between the exposed portions of electrical contact strips 272 and 274, and includes hold-down wings 288 and 290 positioned above and slightly spaced from the exposed portions of electrical contract strips 272 and 274, respectively. Wings 288 and 290 provide for connection of safety lamp 226 to housing 16 and ensure reliable contact of the exposed portions of electrical contact strips 272 and 274 with other contacts provided in housing 16, as will be discussed hereinafter.

In order to connect safety lamp 226 in housing 16, a connector 292 is provided in housing 16. Specifically, and with reference to FIGS. 11 and 13-15, connector 292 includes an outer connector plate 294 and an inner connector plate 296 which fit together to define a chamber therein.

Outer connector plate 294 includes a substantially flat plate 298 having a circular aperture 300 and two diametrically opposite wing slots 302 formed with aperture 300, all of which are accessible through an opening 301 in the side of housing 16, as shown in FIG. 2. In this manner, the main tubular body of connector 284 can extend through circular aperture 300 and hold-down wings 288 and 290 can extend through wing slots 302. Then, safety lamp 226 can be rotated about connector 284, so that hold-down wings 288 and 290 are positioned against the inside surface of flat plate 298, whereby safety lamp 226 is held to housing 16. Depending upon the direction of rotation of safety lamp 226, the latter will be positioned horizontally or vertically, as aforementioned. In this regard, wing slots 302 are formed at a substantially 45 degree angle to the horizontal. In order to aid such rotational movement, and provide added stability, the outer surface of rear cover 254 is formed with an arcuate groove 303 having its center based on the center of connector 284. A guide pin 305 is formed in the side of housing 16 adjacent opening 301 and fits within groove 303 to guide movement of safety lamp 226 between the vertical and horizontal positions.

The inner surface of outer connector plate 294 is formed with four electrical contacts 304, 306, 308 and 310 positioned 90 degrees apart. Each electrical contact 304, 306, 308 and 310 is formed as an L-shaped leaf spring 312 with a base portion 314 that is riveted into outer connector plate 294, and therefore, the rivets 316 extend through to the outer surface of outer connector plate 294. In this manner, when connector 284 is inserted in aperture 300 and wing slots 302, and then rotated by 45 degrees, the exposed portions of electrical contact strips 272 and 274 are in electrical contact with two opposing rivets 316.

Inner connector plate 296 includes a substantially square flat plate 318 and four side walls 320, with outer connector plate 294 sitting on the free edges of side walls 320. Two substantially V-shaped electrical contacts 322 and 324 are positioned in inner connector plate 296. Specifically, upstanding walls 326, 328, 330, 332 and 334 are formed on the inner surface of flat plate 318 and define an area within which V-shaped electrical contact 322 is positioned. V-shaped electrical contact 322 includes two legs 336 and 338 extending at an angle from a base portion 340. In this regard, a supplemental upstanding wall 342 is formed on the inner surface of inner connector plate 296 and is spaced slightly from upstanding wall 330 to define a gap therebetween and within which base portion 340 of electrical contact 322 is positioned. Further, each V-shaped electrical contact 322 and 324 includes an electrical contact portion 341 extending from base portion 340. Thus, electrical contact portion 341 of V-shaped electrical contact 322 extends through an aperture 343 in flat plate 318 in the aforementioned gap between walls 330 and 342. Such electrical contact portion 341 is connected with a wire 345 that supplies it with the same current from the vehicle's battery. It is noted from FIG. 15 that legs 336 and 338 extend slightly away and not in contact with upstanding walls 328, 330 and 332 and 334. In addition, a center limiting wall 344 is formed on the inner surface of inner connector plate 296 to prevent legs 336 and 338 being biased together.

Figure 15:
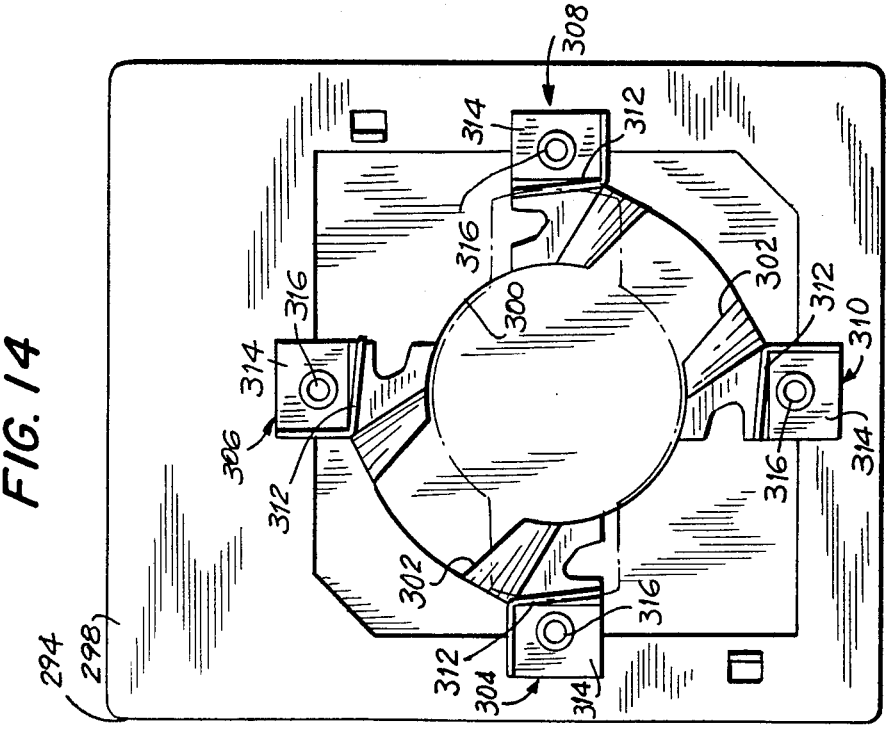
FIG. 15 is a cross-sectional view of the connector of FIG. 11, taken along line 15—15 thereof.
Figure 18:
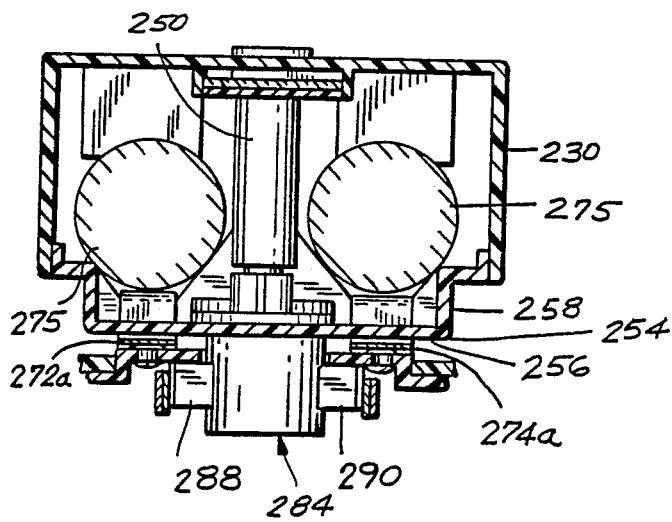
FIG. 18 is a cross-sectional view of the safety lamp of FIG. 17, taken along line 18—18 thereof.
Figure 19:
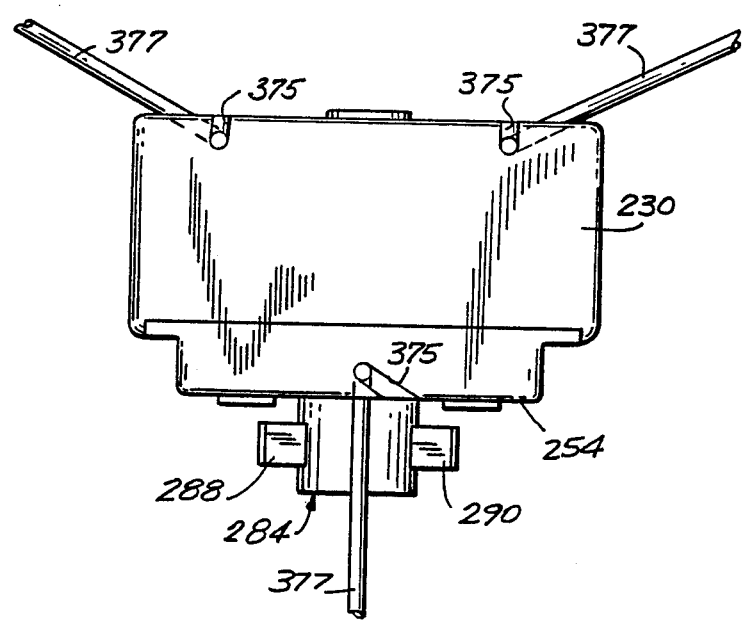
FIG. 19 is a bottom plan view of the safety lamp of FIG. 2.

In addition, walls 326 and 328 are spaced slightly from each other to define a gap 346 therebetween. In like manner, walls 332 and 334 are spaced slightly from each other to define a gap 348 therebetween. When outer connector plate 294 and inner connector plate 296 are assembled together, the L-shaped leaf spring 312 of electrical contacts 304 and 306 of outer connector plate 294 are positioned within gaps 346 and 348, and also extend along upstanding walls 326 and 334, as shown in FIG. 15, slightly spaced away from and out of contact with legs 336 and 338 of V-shaped electrical contact 322.

In like manner, diametrically opposite the above arrangement, upstanding walls 350, 352, 354, 356 and 358 are formed on the inner surface of flat plate 318 and define an area within which V-shaped electrical contact 324 is positioned. V-shaped electrical contact 324 includes two legs 360 and 362 extending at an angle from a base portion 364. In this regard, a supplemental upstanding wall 368 is formed on the inner surface of inner connector plate 296 and is spaced slightly from upstanding wall 354 to define a gap therebetween and within which base portion 364 of electrical contact 324 is positioned. Further, the electrical contact portion 341 of V-shaped electrical contact 324 extends through an aperture 369 in flat plate 318 in the aforementioned gap between walls 354 and 368. The electrical contact portion 341 of V-shaped electrical contact 324 is connected with a wire 371 that supplies it with the same current from the vehicle's battery. It is noted from FIG. 15 that legs 360 and 362 extend slightly away and not in contact with upstanding walls 350, 352, 356 and 358. In addition, a center limiting wall 370 is formed on the inner surface of inner connector plate 296 to prevent legs 360 and 362 being biased together.

In addition, walls 350 and 352 are spaced slightly from each other to define a gap 370 therebetween. In like manner, walls 356 and 358 are spaced slightly from each other to define a gap 372 therebetween. When outer connector plate 294 and inner connector plate 296 are assembled together, the L-shaped leaf spring 312 of electrical contacts 308 and 310 of outer connector plate 294 are positioned within gaps 370 and 372, and also extend along upstanding walls 350 and 358, as shown in FIG. 15, slightly spaced away from and out of contact with legs 360 and 362 of V-shaped electrical contact 324.

When connector 284 is inserted within circular aperture 300 and wing slots 302, and then rotated by 45 degrees, hold-down wings 288 and 290 bias either legs 336 and 360 against electrical contacts 304 and 308, respectively, or legs 338 and 362 against electrical contacts 306 and 310, respectively. As a result, regardless of whether safety lamp 226 is positioned horizontally or vertically, the exposed portions of electrical contact strips 272 and 274 are each in electrical contact with V-shaped electrical contacts 322 and 324, respectively, and supplied with current from the vehicle's battery.

As discussed above, safety lamp 226 can be separated from housing 16 so as to operate on C-cell batteries 275. In this regard, the bottom of safety lamp 226 is formed with three grooves 375 which are adapted to receive three tripod legs 377, respectively, for supporting safety lamp 226 in the separated, vertical position shown in dashed lines in FIG. 1.

Figure 21:
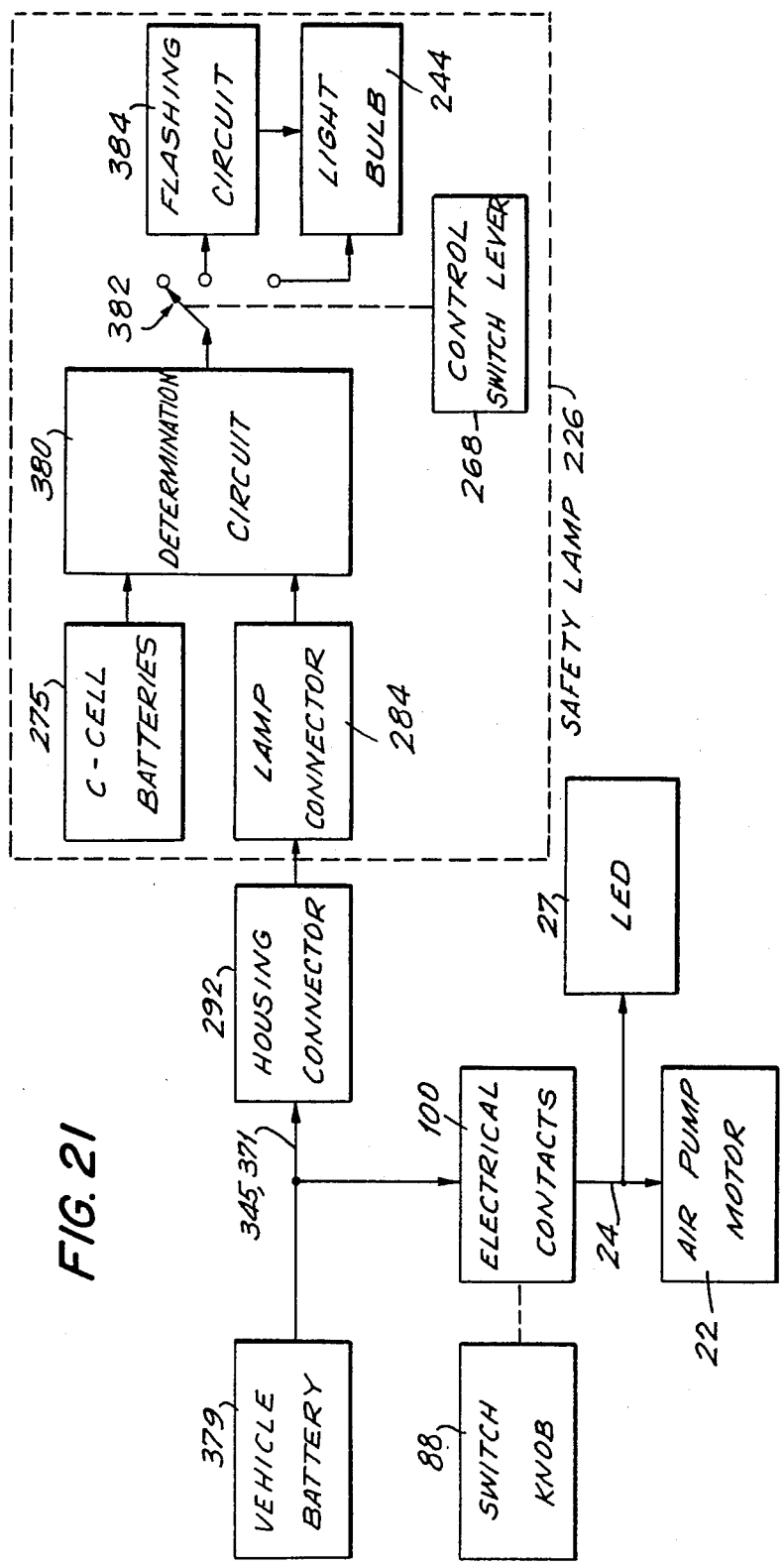
FIG. 21 is a schematic block diagram of the circuitry used for the portable air pump assembly and detachable safety lamp of FIG. 1.

Referring now to FIG. 21, the electrical circuitry for the present invention will now be described. Specifically, the vehicle's battery 379 is connected to housing connector 292 by wires 345 and 371, as also shown in FIG. 3. Housing connector 292 is detachably connected with lamp connector 284, as aforementioned; and supplies current to lamp connector 284 by such attachment. A determination circuit 380 is connected with the outputs of the C-cell batteries 275 and the lamp connector 284, and senses when current is supplied from lamp connector 284, that is, when safety lamp 226 is attached to housing 16. In such case, determination circuit 380 supplies current from lamp connector 284. If safety lamp 226 is detached from housing 16, or whenever the plug is not plugged in the lighter, determination circuit 380 detects no current from lamp connector 284, and therefore supplies current from the C-cell batteries 275.

The current is supplied from determination circuit 380 to a switch 382. Although switch 382 is shown as a triple pole, single throw mechanical switch, it will be appreciated that switch 382 is preferably an electrical switch comprised of conventional semiconductor devices. Switch 382 includes three terminals, a first OFF terminal, a second FLASH terminal and a third ON terminal. The movable arm of switch 382 is controlled by the aforementioned control switch lever 268. Thus, when the movable arm of switch 382 is moved to the OFF terminal, no current is supplied to light bulb 244. When the movable arm of switch 382 is moved to the FLASH terminal, current is supplied to a conventional flashing circuit 384, which in turn, intermittently supplies current to light bulb 244 to cause the latter to flash on and off at predetermined intervals, for example, three times per second. When the movable arm of switch 382 is moved to the ON terminal, a constant current is supplied to light bulb 244.

The vehicle battery 379 is also connected with electrical contacts 100 which, in turn, are connected with air pump motor 22. When electrical contacts 100 are closed by switch knob 88, current flows from the vehicle battery 379, through electrical contacts 100, to air pump motor 22, to actuate the same. When electrical contacts 100 are open, no current flows to air pump motor 22. However, at such time, current flows to LED 27 to indicate to the user in the vehicle that air pump motor 22 has been shut down.

Having described a specific preferred embodiment of the invention with reference to the accompanying drawings, it will be appreciated that the present invention is not limited to that precise embodiment, and that various changes and modifications may be effected therein by one of ordinary skill in the art without departing from the scope or spirit of the invention as defined in the appended claims.

What is claimed is:

1. A portable air pump assembly comprising:
   (a) electric motor driven air compressor means for generating and delivering pressurized air to a member to be inflated;
   (b) electrical contact means movable from a first condition thereof to a second condition thereof for energizing and de-energizing, respectively, said electric motor driven air compressor means, and
   (c) means for automatically moving said electrical contact means to said second condition when said member to be inflated reaches a preselected pressure, said automatically moving means comprising:
      (1) valve means movable between a closed and open position;
      (2) spring means for biasing said valve means into said closed position, said spring means being adjustable whereby the pressure exerted by said spring means may be preset so as to correspond to said preselected pressure,
      (3) actuation means rotationally mounted with respect to said valve means for effectuating movement of said electrical contact means to said second condition thereof and thereby de-energizing said air compressor means, in response to opening of said valve means
      (4) said valve means, said spring means and said actuation means being coaxially arranged; and
      (5) said valve means being pneumatically connected to the pressurized air being delivered to said member whereby said valve means will be opened when the preselected pressure is reached to cause the automatic de-energization of the air compressor means.

2. A portable air pump assembly according to claim 1; wherein said valve means includes valve body means having an opening fluidly connected with said air compressor means and piston means slidable in said valve body means and biased by said spring means into said closed condition.

3. A portable air pump assembly comprising:
   (a) electric motor driven air compressor means for generating and delivering pressurized air to a member to be inflated;
   (b) electrical contact means movable from a first condition thereof to a second condition thereof for energizing and de-energizing, respectively, said electric motor driven air compressor means, and
   (c) means for automatically moving said electrical contact means to said second condition when said member to be inflated reaches a preselected pressure, said automatically moving means comprising:
      (1) valve means fluidly connected with said air compressor means and biased by adjustable spring means into a closed condition,
      (2) actuation means rotationally mounted with respect to said valve means for effectuating movement of said electrical contact means to said second condition thereof and thereby de-energizing said air compressor means, in response to opening of said valve means, said actuation means including:
         (i) switch knob means rotationally mounted with respect to said valve means for moving said electrical contact means to said first condition upon rotation of said switch knob means to a first position;
         (ii) biasing means for biasing said switch knob means to a second position at which said electrical contact means is moved to said second condition;
         (iii) hold means for holding said switch knob means in said first position; and
         (iv) release means for controlling said hold means to release said switch knob means when said member to be inflated reaches the preselected pressure, such that said biasing means biases said switch knob means to said second position, and
      (3) said valve means being pneumatically connected to the pressurized air being delivered to said member whereby said valve means will be opened when the preselected pressure is reached to cause the automatic de-energization of the air compressor means.

4. A portable air pump assembly according to claim 3; wherein said hold means includes a switch trigger rotatably and axially movable with respect to said valve means; said biasing means includes coil spring means for applying a rotational and axial biasing force to said switch trigger; said switch knob means rotates said switch trigger against the rotational biasing force of said coil spring means so that said hold means holds said switch trigger and thereby said switch knob means in said second position; and said release means includes abutment means connected with said piston means for axially moving said switch trigger with respect to said valve means against the axial biasing force of said coil spring means when said member to be inflated reaches a preselected pressure.

5. A portable air pump assembly comprising:
 (a) electric motor driven air compressor means for generating and delivering pressurized air to a member to be inflated;
 (b) electrical contact means movable from a first condition thereof to a second condition thereof for energizing and de-energizing, respectively, said electric motor driven air compressor means, and
 (c) means for automatically moving said electrical contact means to said second condition when said member to be inflated reaches a preselected pressure, said automatically moving means comprising:
  (1) valve means biased by spring means into a closed condition, said spring means being adjustable whereby the pressure exerted by said spring means may be preset so as to correspond to said preselected pressure, said valve means including valve body means having an opening fluidly connected with said air compressor means and piston means slidable in said valve body means and biased by said spring means into said closed condition,
  (2) actuation means rotationally mounted with respect to said valve means for effectuating movement of said electrical contact means to said second condition thereof and thereby de-energizing said air compressor means, in response to opening of said valve means, said actuation means including:
   (i) switch knob means rotationally mounted with respect to said valve means for moving said electrical contact means to said first condition upon rotation of said switch knob means to a first position;
   (ii) biasing means for biasing said switch knob means to a second position at which said electrical contact means is moved to said second condition;
   (iii) hold means for holding said switch knob means in said first position; and
   (iv) release means for controlling said hold means to release said switch knob means when said member to be inflated reaches the preselected pressure, such that said biasing means biases said switch knob means to said second position, and
  (3) said valve means being pneumatically connected to the pressurized air being delivered to said member whereby said valve means will be opened when the preselected pressure is reached to cause the automatic de-energization of the air compressor means.

6. A portable air pump assembly according to claim 5; wherein said hold means includes a switch trigger rotatably and axially movable with respect to said valve means; said biasing means includes coil spring means for applying a rotational and axial biasing force to said switch trigger; said switch knob means rotates said switch trigger against the rotational biasing force of said coil spring means so that said hold means holds said switch trigger and thereby said switch knob means in said second position; and said release means includes abutment means connected with said piston means for axially moving said switch trigger with respect to said valve means against the axial biasing force of said coil spring means when said member to be inflated reaches a preselected pressure.

7. A portable air pump assembly comprising:
 (a) electric motor driven air compressor means for producing pressurized air and having an outlet to which said pressurized air is supplied;
 (b) air supply line means for supplying said pressurized air from said outlet to a member to be inflated;
 (c) electrical supply line means for supplying current to said air compressor means;
 (d) electrical contact means for permitting current flow from said electrical supply line means to said air compressor means only when said electrical contact means is in a closed condition;
 (e) a by-pass supply line having one end connected with said outlet of said air compressor means and a second, opposite end; and
 (f) pressure limit switch means connected with said second, opposite end of said by-pass supply line for automatically causing termination of the supply of current from said electrical supply line means to said air compressor means in response to back pressure from said member to be inflated, when said member to be inflated has been inflated to a desired air pressure, said pressure limit switch means including:
  (i) a hollow front valve body including an opening fluidly connected with said second, opposite end of said by-pass supply line;
  (ii) a piston slidable in said front valve body;
  (iii) variable biasing means for applying a biasing force on said piston corresponding to said desired air pressure so as to normally bias said piston into blocking relation with respect to said opening in said front valve body;
  (iv) adjustment means for adjusting said biasing force by said variable biasing means;
  (v) a switch trigger rotatably and axially movable on said front valve body;
  (vi) spring means for applying a rotational and axial biasing force to said switch trigger on said front valve body;
  (vii) hold means for holding said switch trigger in a releasable rotational position on said front valve body, against the rotational biasing force of said spring means;
  (viii) switch knob means for rotating said switch trigger against the rotational biasing force of said spring means so that said hold means holds said switch trigger in said releasable rotational position, said switch knob means including cam means for closing said electrical contact means when said switch trigger is held in said releasable rotational position so that current is supplied from said electrical supply line means to said air compressor means; and
  (ix) abutment means connected with said piston for moving said switch trigger axially along said front valve body against the axial biasing force of said spring means to release said switch trigger from said releasable rotational position when said member to be inflated has been inflated to said desired air pressure;

whereby said spring means rotates said switch trigger and said switch knob means when said abutment means moves said switch trigger axially against the axial biasing force of said spring means so that said cam means opens said electrical contact means such that current is no longer supplied from said electrical supply line means to said air compressor means.

8. A portable air pump assembly according to claim 7; wherein said front valve body includes an axially directed slot; and said abutment means includes pin means connected with said piston and extending through said axially directed slot for moving said switch trigger axially along said front valve body against the axial biasing force of said spring means.

9. A portable air pump assembly according to claim 7; wherein said front valve body includes an internal shoulder in front of said opening thereof; and further including a ball biased against said internal shoulder by said piston means and said variable biasing means when the air pressure in said member to be inflated is less than said desired air pressure.

10. A portable air pump assembly according to claim 7; wherein said switch trigger includes a release ramp and said switch knob means includes an actuating ramp in contact with said release ramp for biasing said switch trigger axially on said front valve body against the axial biasing force of said spring means when said switch knob means is rotated to an inoperative position, wherein said hold means no longer holds said switch trigger in said releasable rotational position so that said spring means rotates said switch trigger on said front valve body and wherein said cam means opens said electrical contact means.

11. A portable air pump assembly according to claim 7; wherein said spring means is a torsion spring wound about said switch trigger and connected between said switch trigger and said front valve body.

12. A portable air pump assembly according to claim 7; wherein said electrical supply line means includes an adapter at one end thereof for plugging into a cigarette lighter of an automotive vehicle.

13. A portable air pump assembly according to claim 12; wherein said adapter includes light emitting means for indicating when said air compressor means is shut off.

14. A portable air pump assembly according to claim 7; wherein said hold means includes a projection on said front valve body, and catch means on said switch trigger for catching said projection on said front valve body when said switch trigger is rotated on said front valve body.

15. A portable air pump assembly according to claim 14; wherein said catch means includes a ramp terminating in a catch surface, and said projection rides up said ramp and is held by said catch surface when said switch knob means rotates said switch trigger against the rotational biasing force of said spring means.

16. A portable air pump assembly according to claim 15; wherein said abutment means is positioned in contact with said ramp when said projection is held by said catch means.

17. A portable air pump assembly according to claim 7; wherein said piston is slidable in an axial direction, and said variable biasing means includes a nut slidable in said axial direction and a compression spring positioned between said piston and said nut for applying a force on said piston in dependence on the axial position of said nut.

18. A portable air pump assembly according to claim 17; wherein said nut includes a screw-threaded bore; and said adjustment means includes:
   (a) a screw-threaded shaft having one end screw-threadedly received in said screw-threaded bore of said nut;
   (b) a rotatable screw hub fixedly receiving an opposite end of said screw-threaded shaft; and
   (c) control knob means for rotating said screw hub; wherein rotation of said control knob means causes rotation of said screw hub and said screw-threaded shaft and a consequent axial movement of said nut.

19. A portable air pump assembly according to claim 18; wherein said adjustment means further includes:
   (a) a ones digit counter wheel rotatably coupled with said control knob means, and having ones digits on an external surface thereof;
   (b) a tens digit counter wheel adjacent to said ones digit counter wheel and having tens digits on an external surface thereof; and
   (c) coupling means for rotating said tens digit counter wheel by a small angle corresponding to a change in one of said tens digits on said external surface thereof for each complete revolution of said ones digit counter wheel; and
wherein said ones digits and said tens digits are exposed to display said desired air pressure.

20. A portable air pump assembly according to claim 19; wherein said tens digit counter wheel includes an outer tubular flange having gear teeth extending circumferentially therearound, said ones digit counter wheel includes an outer tubular flange having a small number of gear teeth thereon, and said coupling means includes gear means positioned between said ones digit counter wheel and said tens digit counter wheel and in continuous engagement with the gear teeth on said outer tubular flange of said tens digit counter wheel and in intermittent engagement with the gear teeth on said outer tubular flange of said ones digit counter wheel for rotating said tens digit counter wheel by said small angle for each complete revolution of said ones digit counter wheel, at a time when said small number of gear teeth on said ones digit counter wheel are in meshing engagement with said gear means.

21. A portable air pump assembly and detachable safety lamp, comprising:
   (a) electric motor driven air compressor means for producing pressurized air and having an outlet to which said pressurized air is supplied;
   (b) air supply line means for supplying said pressurized air from said outlet to a member to be inflated;
   (c) electrical contact means for permitting current flow to said air compressor means; and
   (d) pressure limit switch means for actuating said electrical contact means to automatically terminate the supply of current to said air compressor means in response to back pressure from said member to be inflated, when said member to be inflated has been inflated to a desired air pressure, said pressure limit switch means including:
      (i) a hollow front valve body including an opening fluidly connected with said air compressor means;
      (ii) a piston slidable in said front valve body;
      (iii) variable biasing means for applying a biasing force on said piston corresponding to said desired air pressure so as to normally bias said piston into blocking relation with respect to said opening in said front valve body;

(iv) adjustment means for adjusting said biasing force by said variable biasing means;

(v) actuation means rotationally connected with said front valve body for actuating said electrical contact means to permit the flow of current to said air compressor means, said actuation means being actuated in response to movement of said piston when said member to be inflated has been inflated to said desired air pressure so as to control said electrical contact means to prevent the flow of current to said air compressor means; and (vi) said hollow front valve body, said piston, said variable biasing means, and said actuation means being coaxially arranged.

22. A portable air pump assembly and detachable safety lamp, comprising:

(a) a housing;

(b) electric motor driven air compressor means in said housing for producing pressurized air and having an outlet to which said pressurized air is supplied;

(c) air supply line means extending from said housing for supplying said pressurized air from said outlet to a member to be inflated;

(d) electrical supply line means extending from said housing for supplying current to said air compressor means;

(e) electrical contact means in said housing for permitting current flow from said electrical supply line means to said air compressor means only when said electrical contact means is in a closed condition;

(f) a by-pass supply line in said housing and having one end connected with said outlet of said air compressor means and a second, opposite end;

(g) pressure limit switch means in said housing and connected with said second, opposite end of said by-pass supply line for automatically causing termination of the supply of current from said electrical supply line means to said air compressor means in response to back pressure from said member to be inflated, when said member to be inflated has been inflated to a desired air pressure, said pressure limit switch means including:

(i) a hollow front valve body including an opening fluidly connected with said second, opposite end of said by-pass supply line;

(ii) a piston slidable in said front valve body;

(iii) variable biasing means for applying a biasing force on said piston corresponding to said desired air pressure so as to normally bias said piston into blocking relation with respect to said opening in said front valve body;

(iv) adjustment means for adjusting said biasing force by said variable biasing means;

(v) a switch trigger rotatably and axially movable on said front valve body;

(vi) spring means for applying a rotational and axial biasing force to said switch trigger on said front valve body;

(vii) hold means for holding said switch trigger in a releasable rotational position on said front valve body, against the rotational biasing force of said spring means;

(viii) switch knob means for rotating said switch trigger against the rotational biasing force of said spring means so that said hold means holds said switch trigger in said releasable rotational position, said switch knob means including cam means for closing said electrical contact means when said switch trigger is held in said releasable rotational position so that current is supplied from said electrical supply line means to said air compressor means; and (ix) abutment means connected with said piston for moving said switch trigger axially along said front valve body against the axial biasing force of said spring means to release said switch trigger from said releasable rotational position when said member to be inflated has been inflated to said desired air pressure;

whereby said spring means rotates said switch trigger and said switch knob means when said abutment means moves said switch trigger axially against the axial biasing force of said spring means so that said cam means opens said electrical contact means such that current is no longer supplied from said electrical supply line means to said air compressor means; and (h) safety lamp means detachably connected with said housing for providing a warning light, said safety lamp means including first electrical connection means for supplying current to said safety lamp means from said electrical supply line means when said safety lamp means is connected with said housing and second electrical connection means for supplying current to said safety lamp means from a power source contained within said safety lamp means when the latter is detached from said housing.

23. A portable air pump assembly and detachable safety lamp, comprising:

(a) a housing;

(b) electric motor driven air compressor means in said housing for producing pressurized air and having an outlet to which said pressurized air is supplied;

(c) air supply line means extending from said housing for supplying said pressurized air from said outlet to a member to be inflated;

(d) electrical supply line means extending from said housing for supplying current to said air compressor means;

(e) electrical contact means in said housing for permitting current flow from said electrical supply line means to said air compressor means only when said electrical contact means is in a closed condition;

(f) a by-pass supply line in said housing and having one end connected with said outlet of said air compressor means and a second, opposite end;

(g) pressure limit switch means in said housing and connected with said second, opposite end of said by-pass supply line for automatically causing termination of the supply of current from said electrical supply line means to said air compressor means in response to back pressure from said member to be inflated, when said member to be inflated has been inflated to a desired air pressure, said pressure limit switch means including:

(1) valve means fluidly connected with said air compressor means and biased by adjustable spring means into a closed condition, (2) actuation means rotationally mounted with respect to said valve means for effectuating movement of said electrical contact means to said second condition thereof and thereby de-energizing said air compressor means, in response to opening of said valve means, said actuation means including:
  (i) switch knob means rotationally mounted with respect to said valve means for moving said electrical contact means to said first condition upon rotation of said switch knob means to a first position;
  (ii) means for biasing said switch knob means to a second position at which said electrical contact means is moved to said second condition;
  (iii) hold means for holding said switch knob means in said first position; and
  (iv) release means for controlling said hold means to release said switch knob means when said member to be inflated reaches the preselected pressure, such that said biasing means biases said switch knob means to said second position, and
(h) safety lamp means detachably connected with said housing for providing a warning light, said safety lamp means including first electrical connection means for supplying current to said safety lamp means from said electrical supply line means when said safety lamp means is connected with said housing and second electrical connection means for supplying current to said safety lamp means from a power source contained within said safety lamp means when the latter is detached from said housing.

24. A portable air pump assembly and detachable safety lamp according to claim 23; wherein said safety lamp means includes:
  (a) a safety lamp housing having an opening; and
  (b) light emitting means contained in said safety lamp housing for emitting said warning light through said opening in said safety lamp housing.

25. A portable air pump assembly and detachable safety lamp according to claim 24; wherein said safety lamp means further includes filter means movable between a first position in said opening for imparting a predetermined color to said warning light, and a second position away from said opening.

26. A portable air pump assembly and detachable safety lamp according to claim 23; wherein said safety lamp means includes lamp connector means secured thereto for releasably connecting said safety lamp means to said housing.

27. A portable air pump assembly and detachable safety lamp according to claim 26; further including housing connector means mounted in said housing and engageable with said lamp connector means for releasably connecting said safety lamp means to said housing.

28. A portable air pump assembly and detachable safety lamp, comprising:
  (a) a housing;
  (b) electric motor driven air compressor means in said housing for producing pressurized air and having an outlet to which said pressurized air is supplied;
  (c) air supply line means extending from said housing for supplying said pressurized air from said outlet to a member to be inflated;
  (d) electrical supply line means extending from said housing for supplying current to said air compressor means;
  (e) electrical contact means in said housing for permitting current flow from said electrical supply line means to said air compressor means only when said electrical contact means is in a closed condition;
  (f) a by-pass supply line in said housing and having one end connected with said outlet of said air compressor means and a second, opposite end;
  (g) pressure limit switch means in said housing and connected with said second, opposite end of said by-pass supply line for automatically causing termination of the supply of current from said electrical supply line means to said air compressor means in response to back pressure from said member to be inflated, when said member to be inflated has been inflated to a desired air pressure; and
  (h) safety lamp means detachably connected with said housing for providing a warning light, said safety lamp means including:
    (i) first electrical connection means for supplying current to said safety lamp means from said electrical supply line means when said safety lamp means is connected with said housing;
    (ii) second electrical connection means for supplying current to said safety lamp means from a power source contained within said safety lamp means when the latter is detached from said housing;
    (iii) lamp connector means secured thereto for releasably connecting said safety lamp means to said housing, said lamp connector means including a central member and two wing members extending from said central member; and
    (i) housing connector means mounted in said housing and engageable with said lamp connector means for releasably connecting said safety lamp means to said housing, said housing connector means including an inner connector plate and an outer connector plate which fit together to define a chamber therebetween, said outer connector plate including a central aperture for receiving said central member and two wing slots in open communication with said central aperture for receiving said two wing members, whereby rotation of said lamp connector means after said central member and two wing members are inserted through said central aperture and two wing slots, results in said safety lamp means being releasably connected with said housing.

29. A portable air pump assembly and detachable safety lamp according to claim 28; wherein said outer connector plate includes at least two equidistantly spaced electrical contacts secured thereto, each extending through said outer connector plate so as to be exposed at an outer wall and an inner wall thereof; and said first electrical connection means of said safety lamp means has exposed ends at an external surface of said safety lamp means adjacent said lamp connector means for electrical connection with two of said electrical contacts exposed at said outer wall of said outer connector plate when said safety lamp means is releasably connected with said housing, whereby and safety lamp means can be oriented in at least two angular positions in said housing.

30. A portable air pump assembly and detachable safety lamp according to claim 29; wherein there are four equidistantly space electrical contacts secured to said outer connector plate.

31. A portable air pump assembly and detachable safety lamp according to claim 29; wherein said inner connector plate includes at least two equidistantly spaced electrical contacts extending through said inner connector plate so as to be exposed at an outer wall and an inner wall thereof; portions of said electrical contacts that are exposed at said outer wall of said inner connector plate being connected with said electrical supply line means; said electrical contacts of said inner and outer connector plates being normally spaced slightly from each other; the electrical contacts of one of said inner and outer connector plates being resilient so that upon insertion of said central member and two wings into said central aperture and two wing slots and rotation of said safety lamp means, said two wings bias two of said electrical contacts of said one of said inner and outer connector plates into contact with said electrical contacts of the other of said inner and outer connector plates.

32. A portable air pump assembly and detachable safety lamp according to claim 31; wherein said electrical contacts of said inner connector plate are each formed as a substantially V-shaped member having two legs connected by a base portion, each leg forming an electrical contact of said inner connector plate, and said base portion extending through said inner connector plate and being exposed at said outer wall thereof and connected with said electrical supply line means.

33. A safety lamp comprising:
a main housing:
a safety lamp housing detachably connected with said main housing, said safety lamp housing including compartment means for housing auxiliary power means and an opening;
light emitting means mounted to said safety lamp housing for emitting a warning light through said opening in said safety lamp housing;
electrical supply line means for electrically connecting said main housing to a main power supply;
means for supplying current to said light emitting means from said electrical supply line means when said safety lamp housing is connected with said main housing and said electrical supply line means supplies current from said main power supply to said main housing, and for supplying current to said light emitting means from said auxiliary power means when said safety lamp housing is not connected with said main housing or when no current is supplied to said electrical supply line means from said main power supply;
lamp connector means secured to said safety lamp housing for releasably connecting said safety lamp housing to said main housing, said lamp connector means includes a central member and two wing members extending from said central member; and
housing connector means mounted in said main housing and engageable with said lamp connector means for releasably connecting said safety lamp housing to said main housing, said housing connector means including an inner connector plate and an outer connector plate which fit together to define a chamber therebetween, said outer connector plate including a central aperture for receiving said central member and two wing slots in open communication with said central aperture for receiving said two wing members, whereby rotation of said lamp connector means after said central member and two wing members are inserted through said central aperture and two wing slots, results in said safety lamp housing being releasably connected with said main housing.

34. A safety lamp according to claim 33; wherein said outer connector plate includes at least two equidistantly spaced electrical contacts secured thereto, each extending through said outer connector plate so as to be exposed at an outer wall and an inner wall thereof; and said first electrical connection means of said safety lamp housing has exposed ends at an external surface thereof adjacent said lamp connector means for electrical connection with two of said electrical contacts exposed at said outer wall of said outer connector plate when said safety lamp housing is releasably connected with said main housing, whereby said safety lamp housing can be oriented in at least two angular positions in said main housing.

35. A safety lamp according to claim 34; wherein there are four equidistantly space electrical contacts secured to said outer connector plate.

36. A safety lamp according to claim 34; wherein said inner connector plate includes at least two equidistantly spaced electrical contacts extending through said inner connector plate so as to be exposed at an outer wall and an inner wall thereof; portions of said electrical contacts that are exposed at said outer wall of said inner connector plate being connected with said electrical supply line means; said electrical contacts of said inner and outer connector plates being normally spaced slightly from each other; the electrical contacts of one of said inner and outer connector plates being resilient so that upon insertion of said central member and two wings into said central aperture and two wing slots and rotation of said safety lamp housing, said two wings bias two of said electrical contacts of said one of said inner and outer connector plates into contact with said electrical contacts of the other of said inner and outer connector plates.

37. A safety lamp according to claim 36; wherein said electrical contacts of said inner connector plate are each formed as a substantially V-shaped member having two legs connected by a base portion, each leg forming an electrical contact of said inner connector plate, and said base portion extending through said inner connector plate and being exposed at said outer wall thereof and connected with said electrical supply line means

* * * * *